United States Patent
Srikanth et al.

(10) Patent No.: US 11,853,117 B2
(45) Date of Patent: Dec. 26, 2023

(54) ELECTRONIC DEVICE INCLUDING A CAMERA DISPOSED BEHIND A DISPLAY

(71) Applicant: Apple Inc., Cupertino, CA (US)

(72) Inventors: Manohar B. Srikanth, Mountain View, CA (US); Marduke Yousefpor, San Jose, CA (US); Ting Sun, Cupertino, CA (US); Kathrin Berkner-Cieslicki, Los Altos, CA (US); Mohammad Yeke Yazdandoost, San Jose, CA (US); Ricardo J. Motta, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/101,884

(22) Filed: Jan. 26, 2023

(65) Prior Publication Data

US 2023/0168711 A1     Jun. 1, 2023

Related U.S. Application Data

(63) Continuation of application No. 17/682,173, filed on Feb. 28, 2022, now Pat. No. 11,592,864, which is a continuation of application No. 16/580,477, filed on Sep. 24, 2019, now Pat. No. 11,294,422.

(60) Provisional application No. 62/737,487, filed on Sep. 27, 2018.

(51) Int. Cl.
*G06F 1/16*     (2006.01)
*H04N 5/232*    (2006.01)
*H04N 23/63*    (2023.01)

(52) U.S. Cl.
CPC .......... *G06F 1/1605* (2013.01); *G06F 1/1626* (2013.01); *G06F 1/1637* (2013.01); *H04N 23/63* (2023.01)

(58) Field of Classification Search
CPC .... G06F 1/1605; G06F 1/1626; G06F 1/1637; H04N 5/23293
USPC .......................................................... 382/154
See application file for complete search history.

(56) References Cited

U.S. PATENT DOCUMENTS

| | | | |
|---|---|---|---|
| 7,239,367 B2 | 7/2007 | Jin | |
| 9,870,024 B2 | 1/2018 | Evans | |
| 10,996,713 B2 | 5/2021 | Pakula | |
| 2010/0053350 A1 | 3/2010 | Miyauchi | |
| 2014/0327632 A1 | 11/2014 | Roudbari | |
| 2017/0124933 A1 | 5/2017 | Evans | |
| 2017/0187934 A1 | 6/2017 | Kwak | |
| 2019/0363792 A1 | 11/2019 | Tsonev | |
| 2020/0319842 A1* | 10/2020 | Lee | H04R 7/045 |

(Continued)

*Primary Examiner* — David Bilodeau
(74) *Attorney, Agent, or Firm* — Fernando & Partners LLP

(57) ABSTRACT

In one implementation, an apparatus includes a display having a front surface and a back surface. The display includes a plurality of pixel regions that emit light from the front surface to display a displayed image and a plurality of apertures that transmit light from the front surface to the back surface. The apparatus includes a camera disposed on a side of the back surface of the display. The camera is configured to capture a captured image. The apparatus includes a processor coupled to the display and the camera. The processor is configured to receive the captured image and apply a first digital filter to a first portion of the captured image and a second digital filter, different than the first digital filter, to a second portion of the captured image to reduce image distortion caused by the display.

20 Claims, 20 Drawing Sheets

(56) References Cited

U.S. PATENT DOCUMENTS

2021/0136291 A1    5/2021    Chu
2021/0152735 A1    5/2021    Zhou et al.

* cited by examiner

1300

Receiving, from a camera disposed on a side of a back surface of a display that emits light from a front surface of the display, a captured image, wherein the captured image corresponds to light that has passed through the display and restoration optics configured to reduce image distortion caused by the display ⌐1310

Applying a digital filter to at least a portion of the captured image to further reduce image distortion caused by the display ⌐1320

Receiving, from a camera disposed on a side of a back surface of a display that emits light from a front surface of the display, a captured image, wherein the captured image corresponds to light that has passed through the a plurality of apodized apertures of the display ⌐1710

Applying a digital filter to at least a portion of the captured image to reduce image distortion caused by the display ⌐1720

Receiving, from a camera disposed on a side of a back surface of a display that emits light from a front surface of the display, a captured image, wherein the captured image corresponds to light that has passed through a plurality of apertures of the display disposed in a non-grid arrangement ⎯1910

Applying a digital filter to at least a portion of the captured image to reduce image distortion caused by the display ⎯1920

Figure 19

ELECTRONIC DEVICE INCLUDING A CAMERA DISPOSED BEHIND A DISPLAY

CROSS-REFERENCE TO RELATED APPLICATIONS

This application is a continuation of U.S. patent application Ser. No. 17/682,173, filed on Feb. 28, 2022, which is a continuation of U.S. patent application Ser. No. 16/580,477, filed on Sep. 24, 2019, which claims priority to U.S. Provisional Patent App. No. 62/737,487, filed on Sep. 27, 2018, which are all hereby incorporated by reference in their entirety.

TECHNICAL FIELD

The present disclosure generally relates to electronic devices including a camera and a display, and, in particular, to electronic devices including a front-facing camera disposed behind a front-facing display.

BACKGROUND

Some electronic devices include a display which displays an image to a user and a camera which captures image of a scene in which the user is present. However, in some such electronic devices, the camera reduces the potential size of the display, as the camera occupies a portion of the front surface of the electronic device preventing the portion from being occupied by the display.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 13 is a flowchart representation of a method of restoring a captured image with a digital filter based on a point spread function of restoration optics in accordance with some implementations.

FIG. 17 is a flowchart representation of a method of restoring a captured image with a digital filter based on a point spread function of a display having apodized apertures in accordance with some implementations.

FIG. 19 is a flowchart representation of a method of restoring a captured image with a digital filter based on a point spread function of a display having a plurality of apertures disposed in a non-grid arrangement in accordance with some implementations.

Figure 2:
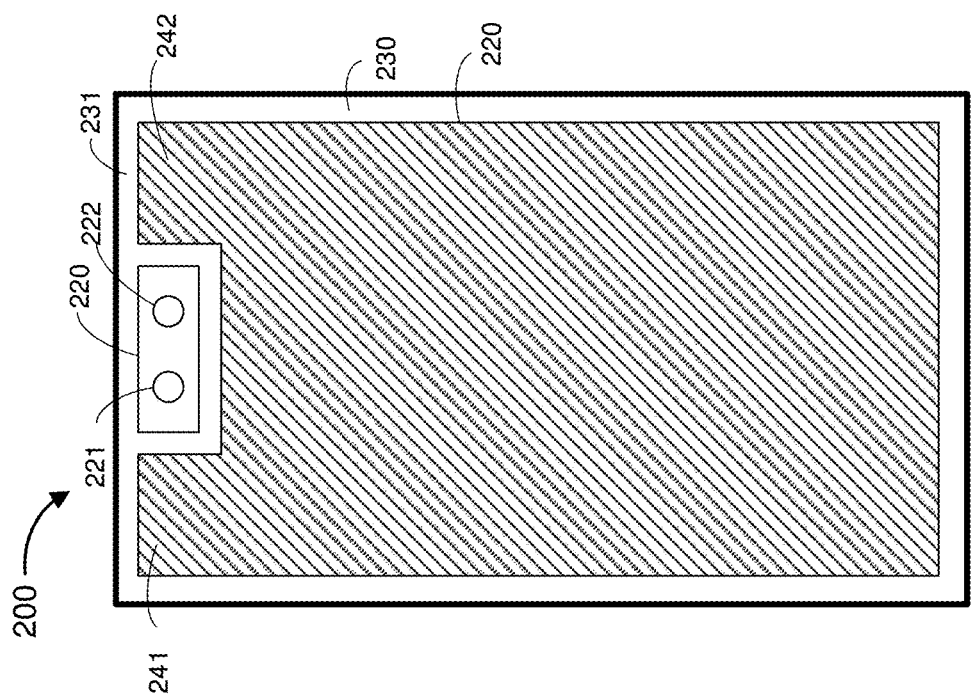
FIG. 2 is a front view of an electronic device including a notch within a top portion of a bezel in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for capturing an image using a camera disposed behind a display.

In various implementations, an apparatus includes a display having a front surface and a back surface. The display includes a plurality of pixel regions that emit light from the front surface to display a displayed image and a plurality of apertures that transmit light from the front surface to the back surface. The apparatus includes a camera disposed on a side of the back surface of the display. The camera is configured to capture a captured image. The apparatus includes a processor coupled to the display and the camera. The processor is configured to receive the captured image and apply a first digital filter to a first portion of the captured image and a second digital filter, different than the first digital filter, to a second portion of the captured image to reduce image distortion caused by the display.

In various implementations, a method includes receiving, from a camera disposed on a side of a back surface of a display that emits light from a front surface of the display, a captured image. The method includes applying a first digital filter to a first portion of the captured image and applying a second digital filter, different than the first digital filter, to a second portion of the captured image to reduce image distortion caused by the display.

In various implementations, an apparatus includes a display having a front surface and a back surface. The display includes a plurality of pixel regions that emit light from the front surface to display a displayed image and a plurality of apertures that transmit light from the front surface to the back surface. The apparatus includes a camera disposed on a side of the back surface of the display. The camera is configured to capture a captured image. The apparatus includes a processor coupled to the display and the camera. The processor is configured to receive the captured image, determine an imaging condition of the captured image, select one of a plurality of digital filters based on the imaging condition, and apply the selected digital filter to the captured image to reduce image distortion caused by the display.

In various implementations, a method includes receiving, from a camera disposed on a side of a back surface of a display that emits light from a front surface of the display, a captured image. The method includes determining an imaging condition of the captured image. The method includes selecting one of a plurality of digital filters based on the imaging condition. The method includes applying the selected one of the plurality of digital filters to at least a portion of the captured image to reduce image distortion caused by the display.

In various implementations, an apparatus includes a display having a front surface and a back surface. The display including a plurality of pixel regions that emit light from the front surface of the display to display a displayed image and a plurality of apertures that transmit light from the front surface to the back surface. The apparatus includes a camera disposed on a side of the back surface of the display. The camera is configured to capture a captured image. The apparatus includes restoration optics disposed between the display and the camera. The restoration optics are configured to reduce image distortion caused by the display. The apparatus includes a processor coupled to the display and the camera. The processor is configured to apply a digital filter to the captured image to further reduce the image distortion caused by the display.

In various implementations, a method includes receiving, from a camera disposed on a side of a back surface of a display that emits light from a front surface of the display, a captured image. The captured image corresponds to light that has passed through the display and restoration optics configured to reduce image distortion caused by the display. The method includes applying a digital filter to at least a portion of the captured image to further reduce image distortion caused by the display.

In various implementations, an apparatus includes a display having a front surface and a back surface. The display includes a plurality of pixel regions that emit light from the front surface to display a displayed image and a plurality of apertures that transmit light from the front surface to the back surface, wherein the plurality of apertures are apodized. The apparatus includes a camera disposed on a side of the back surface of the display. The camera is configured to capture a captured image. The apparatus includes a processor coupled to the display and the camera. The processor is configured to apply a digital filter to the captured image to reduce image distortion caused by the display.

In various implementations, a method includes receiving, from a camera disposed on a side of a back surface of a display that emits light from a front surface of the display, a captured image. The captured image corresponds to light that has passed through a plurality of apodized apertures of the display. The method includes applying a digital filter to at least a portion of the captured image to reduce image distortion caused by the display.

In various implementations, an apparatus includes a display having a front surface and a back surface. The display includes a plurality of pixel regions that emit light from the front surface to display a displayed image and a plurality of apertures that transmit light from the front surface to the back surface, wherein the plurality of apertures are arranged in a non-grid arrangement. The apparatus includes a camera disposed on a side of the back surface of the display. The camera is configured to capture a captured image. The apparatus includes a processor coupled to the display and the camera. The processor is configured to apply a digital filter to the captured image to reduce image distortion caused by the display.

In various implementations, a method includes receiving, from a camera disposed on a side of a back surface of a display that emits light from a front surface of the display, a captured image. The captured image corresponds to light that has passed through a plurality of apertures of the display disposed in a non-grid arrangement. The method includes applying a digital filter to at least a portion of the captured image to reduce image distortion caused by the display.

In various implementations, an apparatus includes a display having a front surface and a back surface. The display includes a plurality of pixel regions that emit light from the front surface to display a displayed image and a plurality of apertures that transmit light from the front surface to the back surface. The apparatus includes a camera disposed on a side of the back surface of the display. The camera is configured to capture a captured image. The apparatus includes a processor coupled to the display and the camera. The processor is configured to dim at least a first portion the display including the apertures when the captured image is captured.

In various implementations, a method includes displaying, on a display having a front surface and a back surface and a plurality of apertures that transmit light from the front surface to the back surface, a displayed image on the front surface. The method includes capturing, with a camera disposed on a side of the back surface of the display, a captured image. The method includes dimming at least a first portion of the display including the apertures when the captured image is captured.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

In various implementations, an electronic device includes a camera and a display. The display emits light on a front side of the device to display an image to a user of the electronic device. In various implementations, the electronic device includes a rear-facing camera which captures an image of a scene on a back side of the electronic device that can be displayed and/or stored by the electronic device. In various implementations, the electronic device includes a front-facing camera which captures an image of a scene on the front side of the electronic device.

In various implementations, a front-facing camera reduces the potential size of the display of the electronic device, as the camera occupies a portion of the front surface of the electronic device preventing the portion from being occupied by the display. Various electronic devices described herein include a front-facing camera disposed behind the display, which is partially transmissive by the inclusion of apertures through the display. These apertures distort the image of the scene captured by the camera. Accordingly, various implementations described herein include partially transmissive displays designed to minimize this distortion, physical optics to compensate for this distortion, and digital processing methods to compensate for this distortion.

Figure 1:
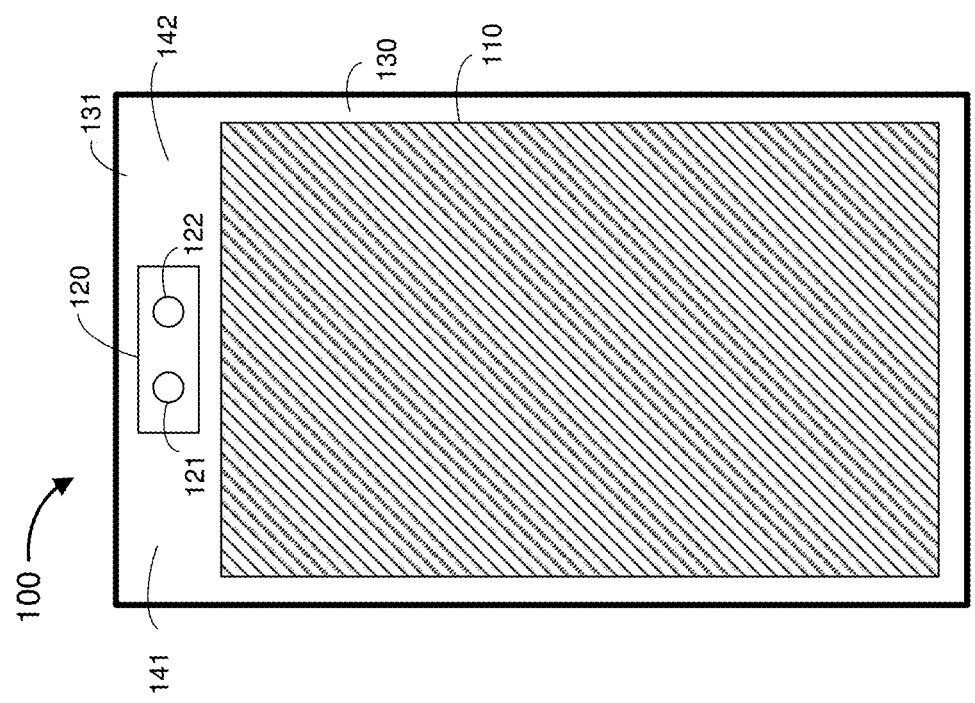
FIG. 1 is a front view of an electronic device including an enlarged top portion of a bezel in accordance with some implementations.

FIG. 1 is a front view of an electronic device 100 including an enlarged top portion 131 of a bezel 130 in accordance with some implementations. The front surface of the electronic device 100 includes a bezel 130 on the edges of the front surface that surrounds a display 110. The bezel 130 includes a top portion 131 in which a front-facing optical capture system 120 is disposed. The front-facing optical capture system 120 includes a visible light camera 121 and an infrared camera 122. In various implementations, the front-facing optical capture system 120 includes a visible light projector (e.g., a flash) or an infrared light projector (e.g., which projects a flood of infrared light and/or a matrix of dots onto a face of user to facilitate facial recognition in the infrared band).

As can be seen from FIG. 1, the top portion 131 of the bezel 130 includes regions 141-142 on either side of the front-facing optical capture system 120 which are not occupied by the display 110 or the front-facing optical capture system 120.

FIG. 2 is a front view of an electronic device 200 including a notch within a top portion 231 of a bezel 230 in accordance with some implementations. The front surface of the electronic device 200 includes a bezel 230 on the edges of the front surface that surrounds a display 210. The bezel 230 includes a top portion 231 in which a front-facing optical capture system 220 is disposed. The front-facing optical capture system 220 includes a visible light camera 221 and an infrared camera 222. In various implementations, the front-facing optical capture system 220 includes a visible light projector (e.g., a flash) or an infrared light projector (e.g., which projects a flood of infrared light and/or a matrix of dots onto a face of user to facilitate facial recognition in the infrared band).

Whereas the top portion 131 of the bezel 130 of the electronic device 100 of FIG. 1 was of a uniform height, the top portion 231 of the bezel 230 of the electronic device 200 of FIG. 2 has a reduced height on either side of the front-facing optical capture system 220 and includes a notch including the front-facing optical capture system 220. Accordingly, as opposed to including regions 141-142 as in the electronic device 100 of FIG. 1, the electronic device 200 of FIG. 2 includes regions 241-242 which are occupied by the display 210.

Figure 3:
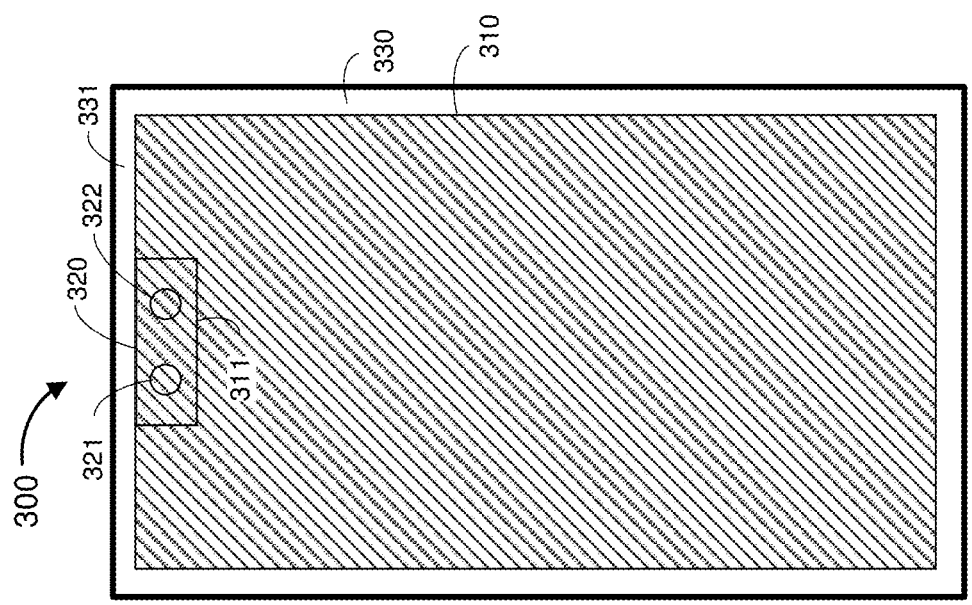
FIG. 3 is front view of an electronic device including a uniform bezel in accordance with some implementations.

FIG. 3 is a front view of an electronic device 300 including a uniform bezel 330. The front surface of the electronic device 300 includes a bezel 330 on the edges of the front surface that surrounds a display 310. The bezel 330 includes a top portion 331 which is of uniform height and substantially the same thickness as other portions of the bezel 330.

The display 310 includes a partially transmissive region 311 behind which a front-facing optical capture system 320 is disposed. In the electronic device 300, the partially transmissive region 311 of the display 310 is disposed at the middle of the top edge of the display 310. The front-facing optical capture system 320 includes a visible light camera 321 and an infrared camera 322. In various implementations, the front-facing optical capture system 320 includes a visible light projector (e.g., a flash) or an infrared light projector (e.g., which projects a flood of infrared light and/or a matrix of dots onto a face of user to facilitate facial recognition in the infrared band).

Whereas the top portion 131 of the bezel 130 of the electronic device 100 of FIG. 1 is of a uniform height, thicker than other portions of the bezel 130, the top portion 331 of the bezel 330 of the electronic device 300 of FIG. 3 has a uniform height and substantially the same thickness as other portions of the bezel 330. Accordingly, the display 310 is substantially rectangular without protruding portions 241-242 as in the electronic device 200 of FIG. 2.

Although FIG. 3 illustrates the partially transmissive region 311 disposed at the middle of the top edge of the display 310, in various implementations, the partially transmissive region 311 is disposed at a side edge (e.g., the left edge) of the top edge of the display 310. In various implementations, the partially transmissive region 311 is disposed within the middle of the display 310 at neither a side edge, the top edge, or the bottom edge of the display 310. Having the front-facing optical capture system 320 disposed in the middle of the display 310 may be advantageous in a number of circumstances. For example, in some embodiments, the display 310 displays a preview of an image to be captured by the visible camera 321. Having the visible camera 321 disposed within the middle of the display 310 (rather than at an edge of the display 310) allows a user to view the preview while keeping eye contact with the visible camera 321.

Although FIG. 3 illustrates an electronic device 300 with a bezel 330, in various implementations, the front surface of the electronic device 300 is entirely occupied by the display 310, referred to as an edge-to-edge display, and the electronic device 300 does not include a bezel 330.

Figure 4:
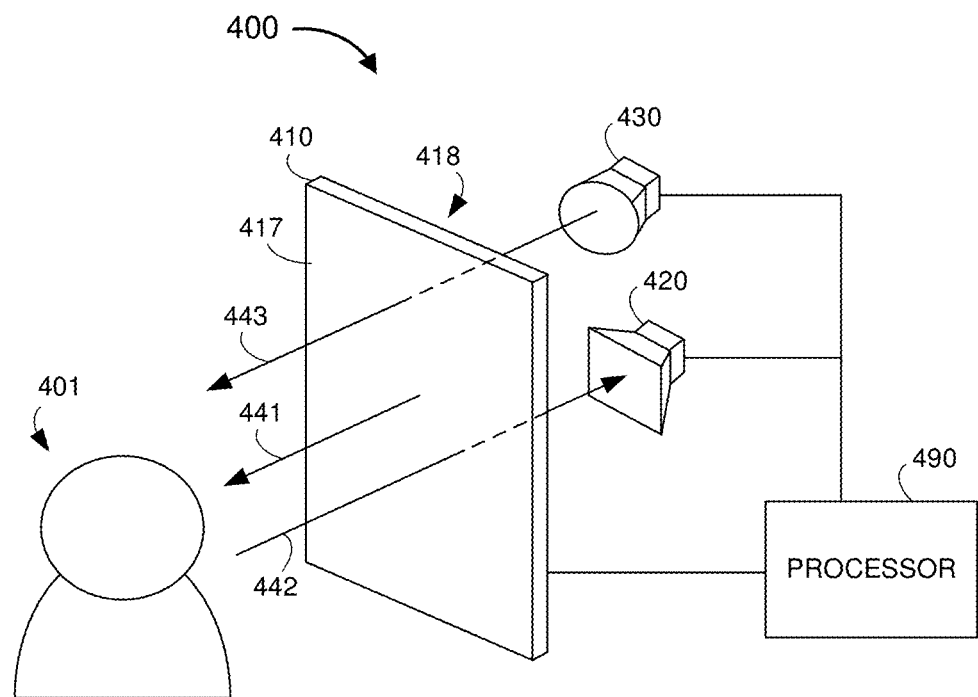
FIG. 4 illustrates an example operating environment in accordance with some implementations.

FIG. 4 illustrates an example operating environment 400 in accordance with some implementations. The example operating environment 400 includes a display 410 having a front surface 417 and a back surface 418. On a side of the front surface (e.g., the front side), the operating environment 400 includes a scene including a subject 401. On a side of the back surface 418 (e.g., the back side), the operating environment 400 includes a camera 420. Accordingly, although the camera 420 does not necessarily contact the display 410, the camera 420 is closer to the back surface 418 of the display 410 than the front surface 417. Further, on the side of the back surface 418, the operating environment 400 includes an illumination source 430. Accordingly, although the illumination source 430 does not necessarily contact the display 410, the illumination source 430 is closer to the back surface 418 of the display 410 than the front surface 417.

The display 410 emits light 441 from the front surface 417 of the display 410 to display a displayed image (which can be seen by the subject 401). The display 410 (or a portion thereof) is partially transmissive and transmits light 442 from the front surface 417 to the back surface 418. Further, the illumination source 430 emits light 443 through the display 410 to illuminate the subject 401. Thus, light 442 from the subject 401 (e.g., generated light, reflected ambient light, or light from the illumination source 430 reflected by the subject 401) passes through the display 410 to the camera 420, which is configured to capture a captured image.

In various implementations, the illumination source 430 and the camera 420 form a depth imaging system. Such a depth imaging system may use several types of illumination, for example a dot projector and a flood light projector. In various implementations, for each illumination case the processing is done differently. In the case of structured light (dot pattern), prior knowledge that the captured image predominantly contains dots (or diffracted dots) improve the restoration performance using "priors" in the estimation.

In various implementations, the illumination from the illumination source 430 itself is also designed to optimize the restoration process. For instance, in a structure light depth sensing imaging system, the geometric shape of the dot patterns is designed ensure the restoration filter can restore the distorted image with high fidelity.

The operating environment 400 includes a processor 490 coupled to the display 410 and the camera 420. The processor 490 provides data to the display 410 indicative of the displayed image and receives data from the camera 420 indicative of the captured image.

Figure 5:
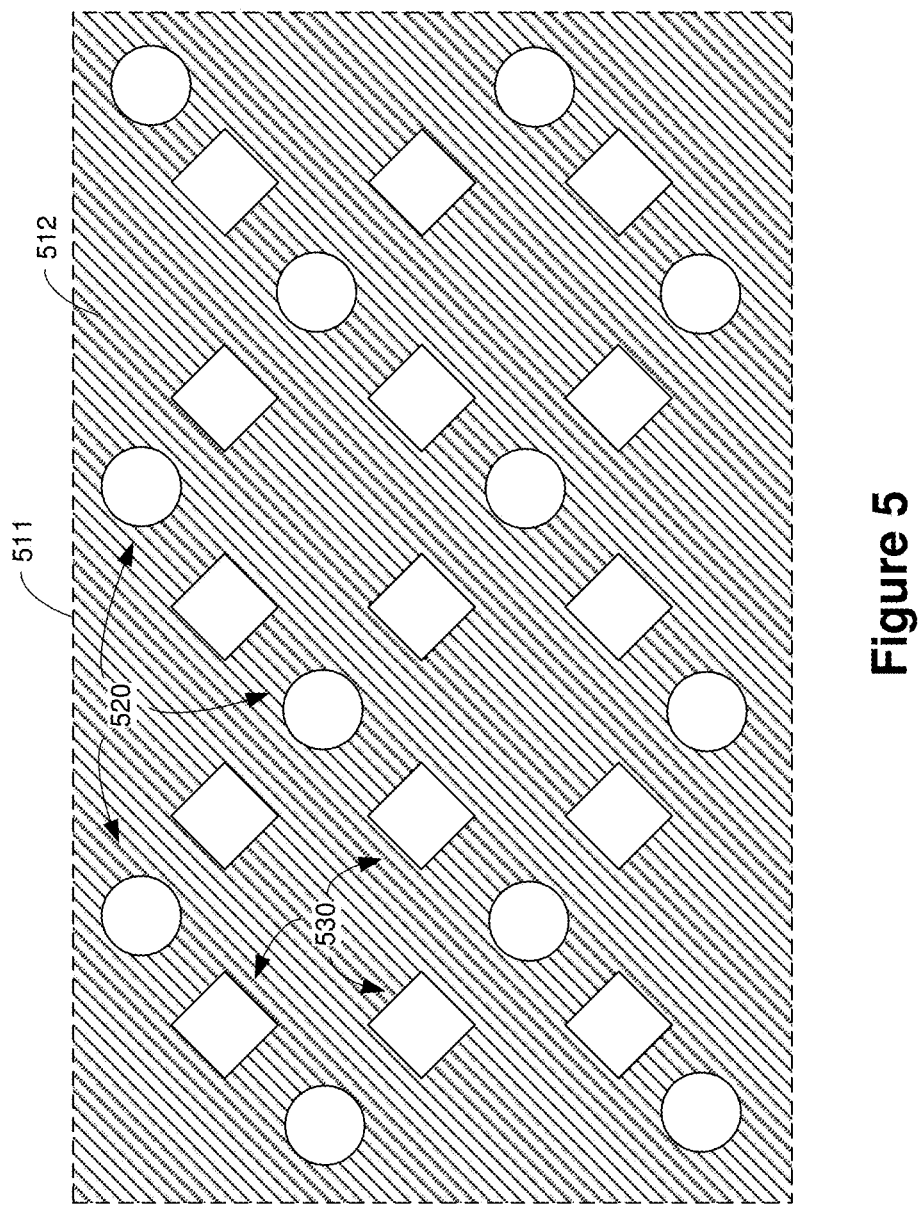
FIG. 5 is a front view of a partially transmissive portion of a display in accordance with some implementations.

FIG. 5 is a front view of a partially transmissive portion 511 of a display in accordance with some implementations. The partially transmissive portion 511 of the display includes a substrate 512 (e.g., an opaque substrate) and, embedded in the substrate 512, a plurality of pixel elements 530 (represented by diamonds) that emit light from the front surface of the display to display a displayed image. The partially transmissive portion 511 of the display includes a plurality of apertures 520 (represented by circles) through the substrate 512 that transmit (or pass) light from the front surface of the display to the back surface of the display.

In various implementations, the apertures 520 are holes in the substrate (e.g., filled with a vacuum or air). In various implementations, the apertures are filled with a transmissive material, such as glass or silicon dioxide.

In FIG. 5, the plurality of pixel elements 530 are arranged in a grid pattern. In various implementations, each of the plurality of pixel elements 530 includes a plurality of sub-pixels that emit light of a particular wavelength. For example, in various implementations, each of the plurality of pixel elements 530 includes a red sub-pixel, a green sub-pixel, and a blue sub-pixel. In various implementations, each of the plurality of pixel elements 530 includes one red sub-pixel, two green sub-pixels, and a blue sub-pixel. In various implementations, each of the plurality of pixel elements includes one red sub-pixel, one green sub-pixel, and two blue sub-pixels. In various implementations, each of the plurality of pixel elements includes one red sub-pixel, one green sub-pixel, one blue sub-pixel, and one yellow sub-pixel.

In FIG. 5, the plurality of apertures 520 are arranged in a grid pattern. In particular in FIG. 5, the grid pattern of the plurality of apertures 520 is less dense than the grid pattern of the plurality of pixel elements 530.

Figure 6C:
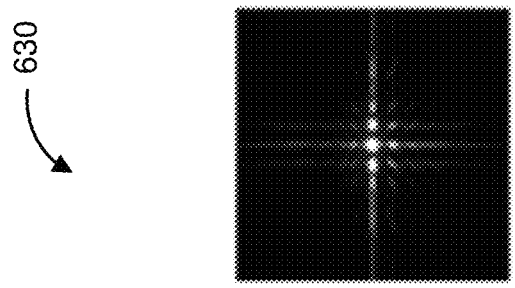
FIG. 6C illustrates an example point spread function of a partially transmissive portion of a display in accordance with some implementations.
Figure 6B:
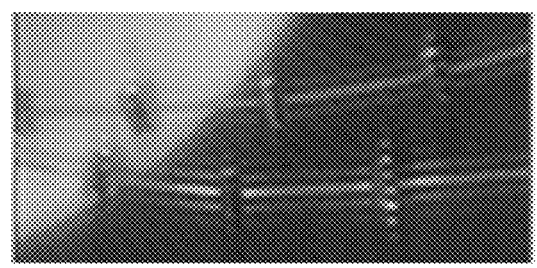
FIG. 6B illustrates an example diffraction image of the subject in accordance with some implementations.
Figure 6A:
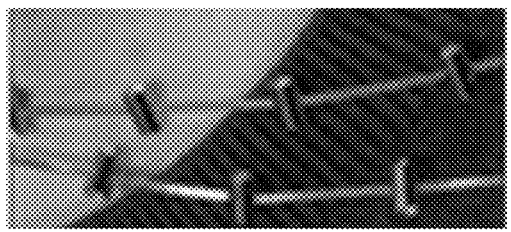
FIG. 6A illustrates an example reference image of a subject in accordance with some implementations.

Light passing through a partially transmissive portion of a display (e.g., light 422 of FIG. 4 or light passing through the plurality of apertures 520 of FIG. 5) is distorted by the passing. FIG. 6A illustrates an example reference image 610 of a subject in accordance with some implementations. FIG. 6B illustrates an example diffraction image 620 of the subject in accordance with some implementations, e.g., an image captured by a camera after light from the subject has passed through a partially transmissive portion of a display. FIG. 6C illustrates an example point spread function (PSF, also referred to as an impulse response of transfer function) of a partially transmissive portion of a display in accordance with some implementations.

As illustrated, the diffraction image 620 is more diffuse than the reference image, generally the convolution of the point spread function 630 with the reference image 610. The point spread function 630 illustrates that different colors are affected differently by the partially transmissive portion of the display. Due to interference effects, the point spread function 630 includes a number of peaks and valleys between the peaks.

Figure 7A:
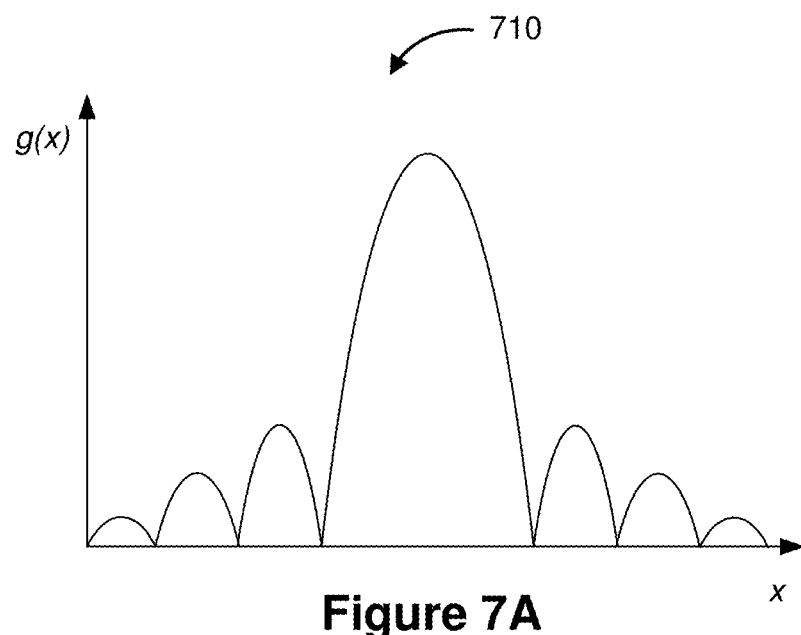
FIG. 7A is an example point spread function in the spatial domain in accordance with some implementations.
Figure 7B:
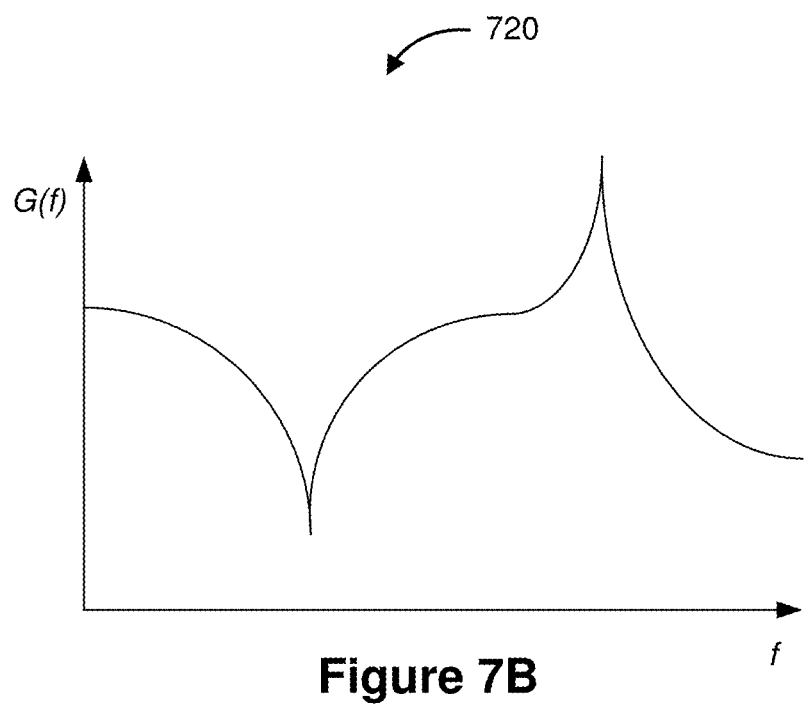
FIG. 7B is an example point spread function in the (spatial) frequency domain in accordance with some implementations.

FIG. 7A illustrates a plot 710 of an example point spread function in the spatial domain (as a function of pixel location) in accordance with some implementations. As noted above, due to interference effects, the point spread function includes a number of peaks and valleys between the peaks. FIG. 7B illustrates a plot 720 of a point spread function in the (spatial) frequency domain (as a function of frequency) in accordance with some implementations. As in the spatial domain, the point spread function includes peaks and valleys in the frequency domain.

Because a partially transmissive portion of a display distorts light passed through the partially transmissive portion of the display captured by a camera (or a sensor thereof) according to a point spread function, in various implementations, an electronic device applies a restoration filter (based on the point spread function) to reduce and/or compensate for this distortion.

Figure 8:
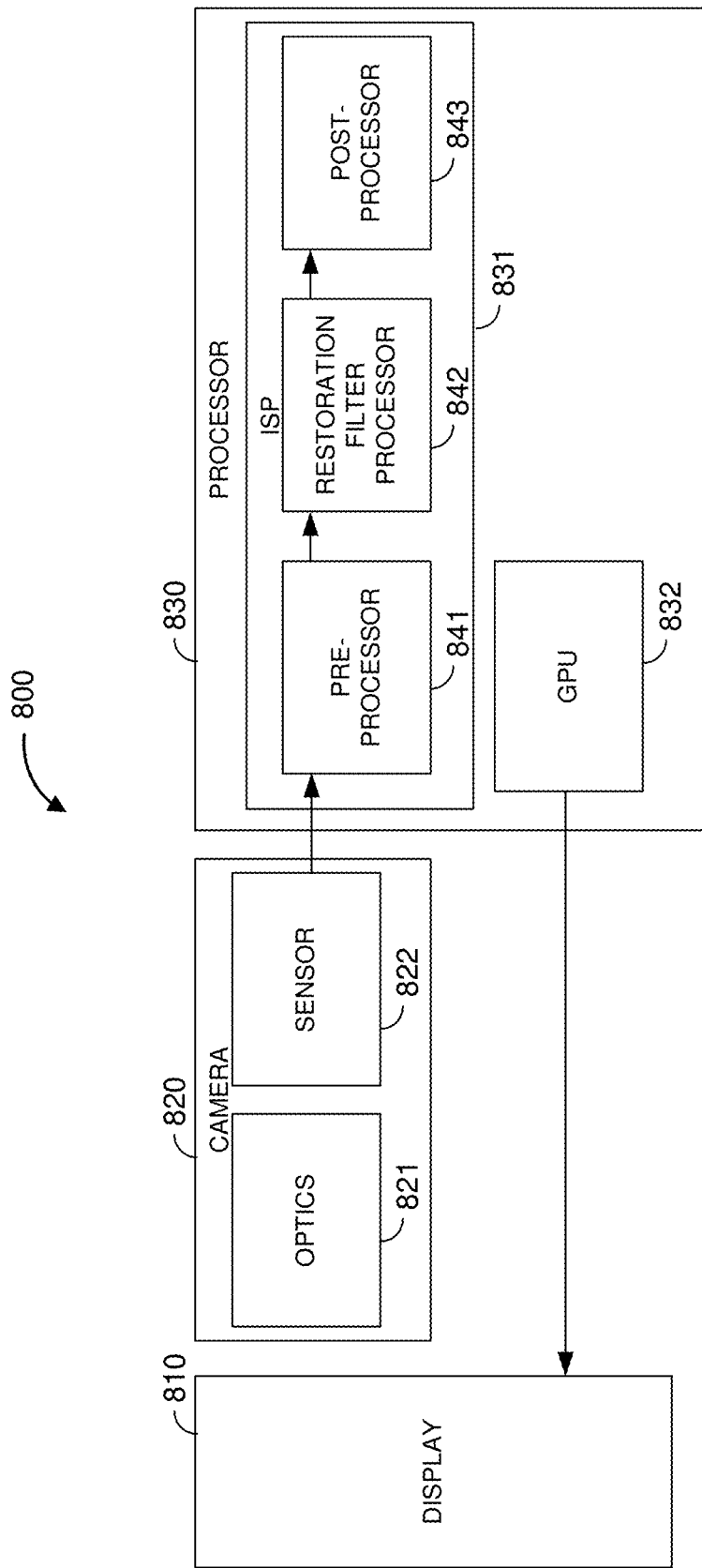
FIG. 8 illustrates a functional block diagram of an electronic device in accordance with some implementations.

FIG. 8 illustrates a functional block diagram of an electronic device 800 in accordance with some implementations. The electronic device 800 includes a display 810. In various implementations, at least a portion of the display 810 is partially transmissive. The electronic device 800 includes a camera 820. In various implementations, the camera 820 is a front-facing camera. In various implementations, the camera 820 is a visible-wavelength camera. In various implementations, the camera 820 is an infrared camera. In various implementations, the camera 820 is disposed on a side of the back surface of the display 810. The camera 820 includes optics 821 and an image sensor 822.

The image sensor 822 generates a captured image. In various implementations, the image sensor 822 includes plurality of sensor elements that detect the intensity of light. In various implementations, the plurality of sensor elements detect the intensity of visible light. In various implementations, the plurality of sensor elements detect the intensity of infrared light. In various implementations, the plurality of sensor elements are arranged in a grid pattern. In various implementations, each of the plurality of sensor elements includes a plurality of sub-elements that detect the intensity of light of a particular wavelength. For example, in various implementations, each of the plurality of sensor elements includes a red sub-element, a green sub-element, and a blue sub-element. In various implementations, each of the plurality of sensor elements includes one red sub-elements, two green sub-elements, and a blue sub-element. In various implementations, each of the plurality of pixel elements includes one red sub-element, one green sub-element, and two blue sub-elements. In various implementations, each of the plurality of pixel elements includes one red sub-element, one green sub-element, one blue sub-element, and one yellow sub-element. In various implementations, each of the plurality of pixel elements includes one red sub-element, one green sub-element, one blue sub-element, and one infrared sub-element.

In various implementations, the captured image includes a matrix of pixels, each pixel having a corresponding pixel value and a corresponding pixel location. In various implementations, the pixel values range from 0 to 255. In various implementations, the image is a RAW image in which each pixel value corresponds to the detected intensity of light by a respective sensor element (or sub-element).

In various implementations, each pixel value is a color triplet including three values corresponding to three color panes. For example, in one implementation, an image is an RGB image and each pixel value includes a red value, a green value, and a blue value. As another example, in one implementation, an image is a YUV image and each pixel value includes a luminance value and two chroma values. In various implementations, the image is a YUV444 image in which each chroma value is associated with one pixel. In various implementations, the image is a YUV420 image in which each chroma value is associated with a 2×2 block of pixels (e.g., the chroma values are downsampled). While specific image formats are provided, it should be appreciated that other pixel formats may be used.

In various implementations, the display 810 is an LED (light emitting diode) display. In various implementations, the display 810 is a micro-LED display or an OLED (organic LED) display. In various implementations, the display 810 includes a substrate with a plurality of pixel elements embedded therein and a plurality of apertures therethrough. In various implementations, the pixel elements are LEDs that, when activated, emit light of different colors. In various implementations, the size and/or density of the plurality of apertures (e.g., an aperture ratio) is higher for a micro-LED display than for an LED display or OLED display. As described above, the plurality of apertures introduce distortion in an image captured by the camera 820.

In various implementations, the display 810 is a liquid-crystal display (LCD). In various implementations, the display 810 includes a substrate with a plurality of pixel elements embedded therein that, when activated, absorb light. Accordingly, in various implementations, the LCD includes a backlight layer disposed on a side of the back surface of the substrate (e.g., between the substrate and the camera 820). In various implementations, the substrate is transparent, allowing light emitted by the backlight layer to pass through the substrate (except at locations of active pixel elements). In various implementations, the backlight layer is transparent to infrared light (or ultraviolet light) and the camera 820 is an infrared camera (or ultraviolet camera) allowing the camera 820 to capture images through the entire display 810.

In various implementations, the LCD includes a back panel disposed on a side of the back surface of the backlight layer (e.g., between the backlight layer and the camera 820). In various implementations, the back surface is controllable between an opaque state (e.g., when an image is being displayed by the display 810) and a transparent state (e.g., when an image is being captured by the camera 820). For example, in various implementations, the back surface is a switchable diffuser. In various implementations, the plurality of pixel elements is arranged in a matrix which imposes diffraction effects. Thus, the plurality of pixel elements introduce distortion in an image captured by the camera 820.

In various implementations, the display 810 is an electroluminescent display (ELD). In various implementations, the display 810 includes a plurality of display elements including electroluminescent material, such as GaAs, between two layers of conductors. When current flows through conductors, the electroluminescent material emits light. Typical ELDs, although potentially transparent, include larger predefined display elements rather than pixels. Accordingly, particular shape, pattern, and number of the display elements introduce distortion in an image captured by the camera 820.

In various implementations, the display 810 is a projection display that includes a substrate upon which projected light from a projector is viewed. In various implementations, the projector is on a side of a back surface of the substrate (e.g., between the substrate and the camera 820). In various implementations, the substrate is controllable between an opaque state (e.g., when an image is being projected onto the substrate) and a transparent state (e.g., when an image is being captured by the camera 820). For example, in various implementations, the substrate is a switchable diffuser. In various implementations, the projector is on a side of a front surface of the substrate. In various implementations, the substrate is a one-way mirror which is reflective when viewed from the side of the front surface, but transmissive when viewed from the side of the back surface.

The electronic device 800 includes a processor 830. The processor 830 includes a graphic processing unit (GPU) 832 which provides data to the display 810 causing the display 810 to display an image. The processor 830 includes an image signal processor 831 which receives data from the camera 820 (or the image sensor 822 thereof) indicative of a captured image.

The image signal processor 831 includes a pre-processor 841, a restoration filter processor 842, and a post-processor 843.

In various implementations, the pre-processor 841 processes the captured image to produce a pre-processed captured image by performing linearization, demosaicing, flat-field correction, denoising, and/or the like. The restoration filter processor 842 processes the pre-processed captured image to produce a restored captured image by applying one or more restoration filters to the pre-processed captured image to reduce image distortion caused by the display 810. The post-processor 843 processes the restored captured image to produce a post-processed captured image by performing demosaicing, denoising, local tone mapping, gamma table mapping and/or the like.

In various implementations, the restoration filters are designed to match (e.g., reduce or compensate for) the distortions introduced by the specific geometric structure and transmission characteristics of the display 810. In various implementations, the filter design further considers noise characteristics (e.g., a signal-to-noise ratio) and dynamic range performance of the camera 820.

In various implementations, a restoration filter is generated based on the point spread function of the display 810. In various implementations, a restoration filter is based on the combined point spread function of the display 810 and the camera 820. In various implementations, the point spread function of the camera 820 is a broadband point spread function. In various implementations, the point spread function is estimated using one or more of a model of the display 810, a model of the optics 821, a model of the sensor 822, and empirical measurements of the point spread function. For example, in various implementations, a first estimation of the point spread function is generated using models of the display 810, the optics 821, and the sensor 822. In various implementations, the first estimation is based on analytical methods, numerical methods, or both. Further, the second estimation of the point spread function is generated based on the first estimation of the point spread function and empirical measurements of the point spread function.

In various implementations, the restoration filter inverts diffraction effects of the display 810 and restores the captured image. In various implementations, it is desirable to restore the captured image such it is indistinguishable from an image captured without a display 810 in front of the camera 820.

The captured image may be modeled by the following equation, where $I_C$ is the captured image, $I_I$ is the ideal image to be captured/recovered, G is the point spread function of the display 810 (and, optionally, the optics 821 and/or sensor 822), N is noise, and the asterisk connotes convolution:

$$I_C = (I_I * G) + N.$$

Converting the equation to the frequency domain (e.g., via a Fourier transform, discrete cosine transform, etc.) yields the following:

$$F[I_C] = (F[I_I]F[G]) + F[N].$$

Solving for the ideal image yields the following:

$$F[I_I] = \frac{F[I_C] - F[N]}{F[G]}.$$

Thus, in various implementations, recovering the ideal image involves dividing by the frequency-domain point spread function. Similarly, such division can be accomplished by multiplication by the following frequency-domain restoration filter transfer function, F[H] (referred to as a direct inverse filter), where the subscript asterisk connotes complex conjugation:

$$F[H] = \frac{F^*[G]}{|F[G]|^2}.$$

At frequencies at which the frequency-domain point spread function is small (e.g., a valley as shown in FIG. 7), such division undesirably amplifies noise. Accordingly, in various implementations, the frequency domain restoration filter transfer function, F[H], is as follows (referred to as a Wiener filter), where SNR is the signal-to-noise ratio of the captured image.

$$F[H] = \frac{F^*[G]}{|F[G]|^2 + SNR}.$$

Accordingly, in various implementations, the restoration filter processor 842 applies a restoration filter based on the estimated point spread function. In various implementations, the restoration filter is a direct inverse filter or a Wiener filter. In some implementations, the restoration filter is based on a direct inverse filter or a Wiener filter, e.g., a modification of a generated direct inverse filter or Wiener filter.

In various implementations, a single estimated point spread function of the display 810 is more or less accurate at different portions of the display 810 (corresponding to different portions of the captured image). Accordingly, in various implementations, multiple point spread functions are estimated for different portions of the display 810, different restoration filters are generated for the different portions, and the restoration filter processor 842 applies the different restoration filters to different portions of the captured image.

As described above, in various implementations, the captured image is a RAW image in which each pixel value corresponds to the detected intensity of light by a respective sub-element. Accordingly, different subsets of pixels of the captured image correspond to different color panes. In some embodiments, different restoration filters are generated for different color panes and, before demosaicing is performed (e.g., by the post-processor 843), the different restoration filters are applied to the different color panes.

As also described above, in various implementations, the captured image is an RGB image in which each pixel value includes a color triplet including a red value, a green value, and a blue value. Accordingly, different portions of the pixel values correspond to different color panes. In some embodiments, different restoration filters are generated for different color panes and, after demosaicing is performed to generate the RGB image (e.g., by the pre-processor 841), the different restoration filters are applied to the different color panes. For example, in various implementations, the point spread function of the display 810 is a function of color (e.g., wavelength). Accordingly, in various implementations, the restoration filter is a function of color, based on the spectral characteristics of the display.

In some embodiments, different restoration filters are generated for different spatial portions (e.g., tiles) of the captured image (e.g., based on different estimated point spread functions for different corresponding portions of the display 810) and the different restoration filters are applied to the different spatial portions of the captured image.

Figure 9:
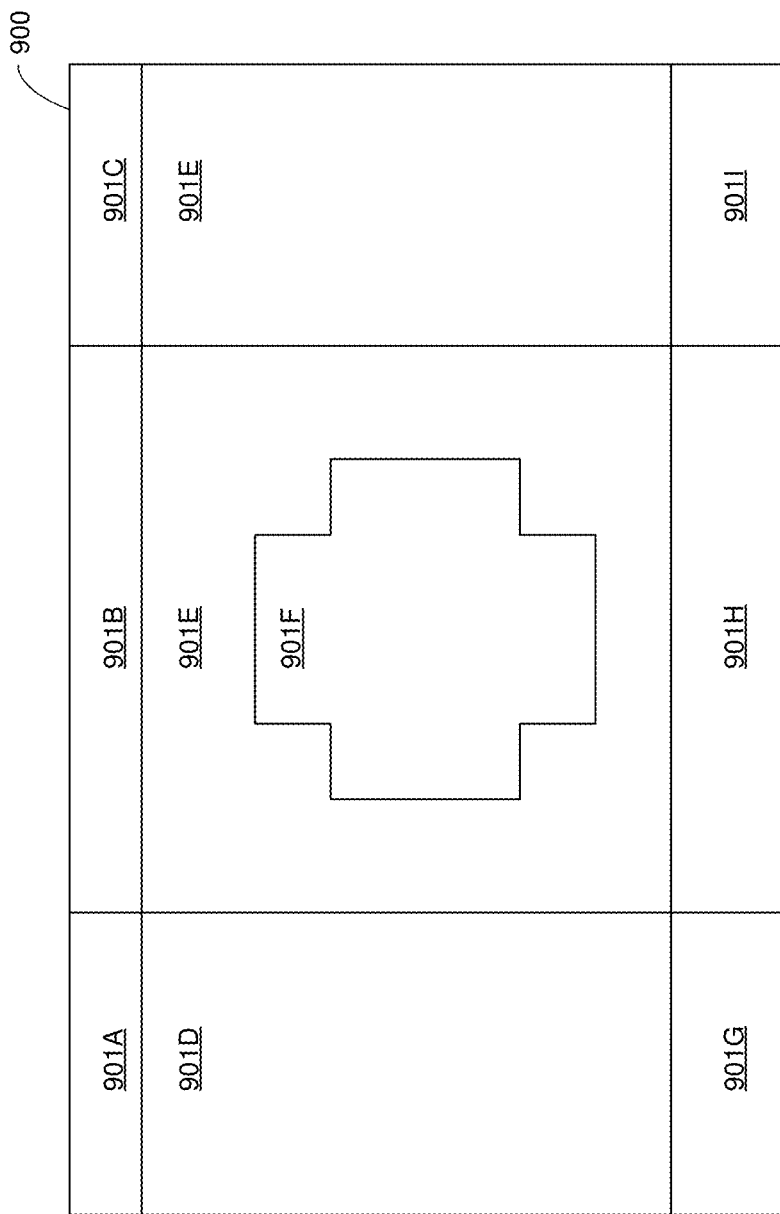
FIG. 9 illustrates an example partition of a captured image (or a color pane thereof) into a plurality of spatial portions in accordance with some implementations.

FIG. 9 illustrates an example partition of a captured image 900 (or a color pane thereof) into a plurality of spatial portions 901A-901I in accordance with some implementations. In various implementations, at least two of the plurality of spatial portions 901A-901I are of unequal size. For example, in FIG. 9, a first spatial portion 901A is smaller than a second spatial portion 901B. In various implementations, at least one of the plurality of spatial portions 901A-901I is of irregular shape (e.g., not a square or rectangle). For example, in FIG. 9, a third spatial portion 901C is irregularly shaped.

Figure 10:
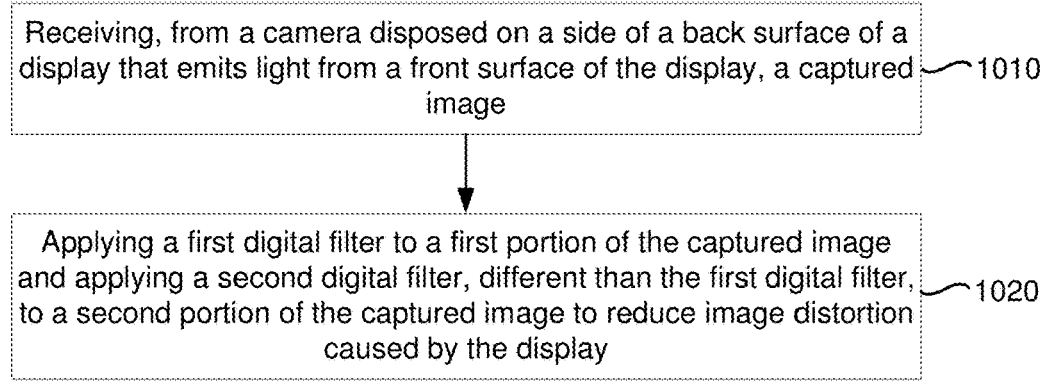
FIG. 10 is a flowchart representation of a method of restoring a captured image with multiple digital filters in accordance with some implementations.

FIG. 10 is a flowchart representation of a method 1000 of restoring a captured image with multiple digital filters in accordance with some implementations. In various implementations, the method 1000 is performed by a device with one or more processors, non-transitory memory, a display having a front side and a back side, the display including a plurality of pixel regions that emit light from the front side to display a displayed image and a plurality of apertures that transmit light from the front side to the back side, and a camera disposed on the back side of the display, the camera configured to capture a captured image (e.g., the electronic device 800 of FIG. 8).

In some implementations, the method 1000 is performed by processing logic, including hardware, firmware, software, or a combination thereof. In some implementations, the method 1000 is performed by a processor executing instructions (e.g., code) stored in a non-transitory computer-readable medium (e.g., a memory). Briefly, in some circumstances, the method 1000 includes receiving a captured image captured through a display and applying different digital filters to different portions of the captured image to reduce image distortion caused by the display.

The method 1000 begins, in block 1010, with the device receiving, from a camera disposed on a side of a back surface of a display that emits light from a front surface of the display, a captured image. In various implementations, the device includes the camera (and, optionally, the display) and the device captures the captured image using the camera. In various implementations, the device receives the captured image from a camera separate from the device.

In some embodiments, the captured image is a RAW image in which each pixel value corresponds to the detected intensity of light by a respective sub-element associated with a color pane. In some embodiments, the captured image is an RGB image in which each pixel value includes a color triplet including three values corresponding to three color panes. In some embodiments, the captured image is an infrared image.

The method 1000 continues, at block 1020, with the device applying a first digital filter to a first portion of the captured image and applying a second digital filter, different than the first digital filter, to a second portion of the captured image to reduce image distortion caused by the display.

In some embodiments, applying the first digital filter and applying the second digital filter includes partitioning the captured image into the first portion and the second portion, applying the first digital filter to the first portion to generate a filtered first portion, applying the second digital filter to the second portion to generate a filtered second portion, and assembling the filtered first portion and the filtered second portion to generate a filtered captured image. In various implementations, assembling the filtered first portion and the filtered second portion includes demosaicing (e.g., of color pane portions of a RAW image), generating color triplets (e.g., of color pane portions of an RGB image), or stitching spatial portions together (which may include filtering at the edges).

In various implementations, the first portion of the captured image corresponds to a first color pane of the captured image and the second portion of the captured image corresponds to a second color pane, different than the first color pane, of the captured image. In some embodiments, the method 1000 further includes demosaicing the captured image after applying the first digital filter and the second digital filter (e.g., when the captured image is a RAW image). In some embodiments, the method 1000 further includes demosaicing the captured image before applying the first digital filter and the second digital filter (e.g., to generate the captured image as an RGB image).

In various implementations, the first portion of the captured image corresponds to a first spatial portion of the captured image and the second portion of the captured image corresponds to a second spatial portion of the captured image. In some embodiments, the first spatial portion is non-overlapping with the second spatial portion. In some embodiments, the first spatial portion is of a different size than the second spatial portion. In some embodiments, the first spatial portion is irregularly shaped (e.g., not rectangular).

In various implementations, applying the first digital filter and applying the second digital filter includes applying predetermined filters stored in a non-transitory memory. For example, coefficients for the filters can be stored in the non-transitory memory before the captured image is received (in block 1010).

In various implementations, applying the first digital filter and applying the second digital filter includes generating the first digital filter and generating the second digital filter, different than the first digital filter. For example, in some embodiments, the method 1000 includes estimating a point spread function of the display, generating the first digital filter based on the point spread function, and generating the second digital filter, different from the first digital filter, based on the point spread function (in some embodiments, the same point spread function). As another example, in some embodiments, the method 1000 includes estimating a first point spread function of a first portion of the display corresponding to the first portion of the captured image and estimating a second point spread function, different from the first point spread function, of a second portion of the display corresponding to the second portion of the captured image and further includes generating the first digital filter based on the first point spread function and generating the second digital filter, different from the first digital filter, based on the second point spread function.

Although the method 1000 has been described above with respect to a first digital filter applied to a first portion of a captured image and a second digital filter applied to a second portion of a captured image, it is to be appreciated that the method can be performed by applying any number (e.g., three, four, ten, twenty, one-hundred, etc.) of different digital filters to different portions of the captured image to reduce distortion caused by the display. For example, in various implementations, different digital filters are applied to various spatial portions of each of a plurality of color panes.

As noted above, in various implementations, the method 1000 is performed by the electronic device 800 of FIG. 8. Accordingly, in some embodiments, the electronic device 800 of FIG. 8 constitutes an apparatus comprising a display 810 having a front surface and a back surface, the display 810 including a plurality of pixel regions that emit light from the front surface to display 810 a displayed image and a plurality of apertures that transmit light from the front surface to the back surface (which introduces image distortion). The apparatus comprises a camera 820 disposed on a side of the back surface of the display, the camera 820 configured to capture a captured image. The apparatus comprises a processor 830 coupled to the display 810 and the camera 820, the processor 830 configured to receive the captured image and apply a first digital filter to a first portion of the captured image and a second digital filter, different than the first digital filter, to a second portion of the captured image to reduce the image distortion caused by the display 810.

As described above, in various circumstances, the restoration filter processor 842 applies different filters to different portions of the captured image. Further, in various circumstances, the restoration filter processor 842 applies different filters to the same portion of different captured images captured under different imaging conditions.

For example, in various implementations, when the camera 820 operates in low-light, low-SNR conditions, the applied restoration filter is designed to be robust to noise.

However, when the camera operates in bright-light, high-SNR conditions, the applied restoration filter is designed to produce fewer artifacts and a sharper image.

As another example, in various implementations, when the camera 820 is being used to capture a visible light image of the scene for later viewing by a user, the applied restoration filter attempts to preserve the visual fidelity of the image as seen by a user. However, when the camera 820 is being used to capture an infrared image of a face of the user to perform facial recognition, the applied restoration filter attempts to ensure the accuracy of the facial recognition at the expense of visual fidelity.

Figure 11:
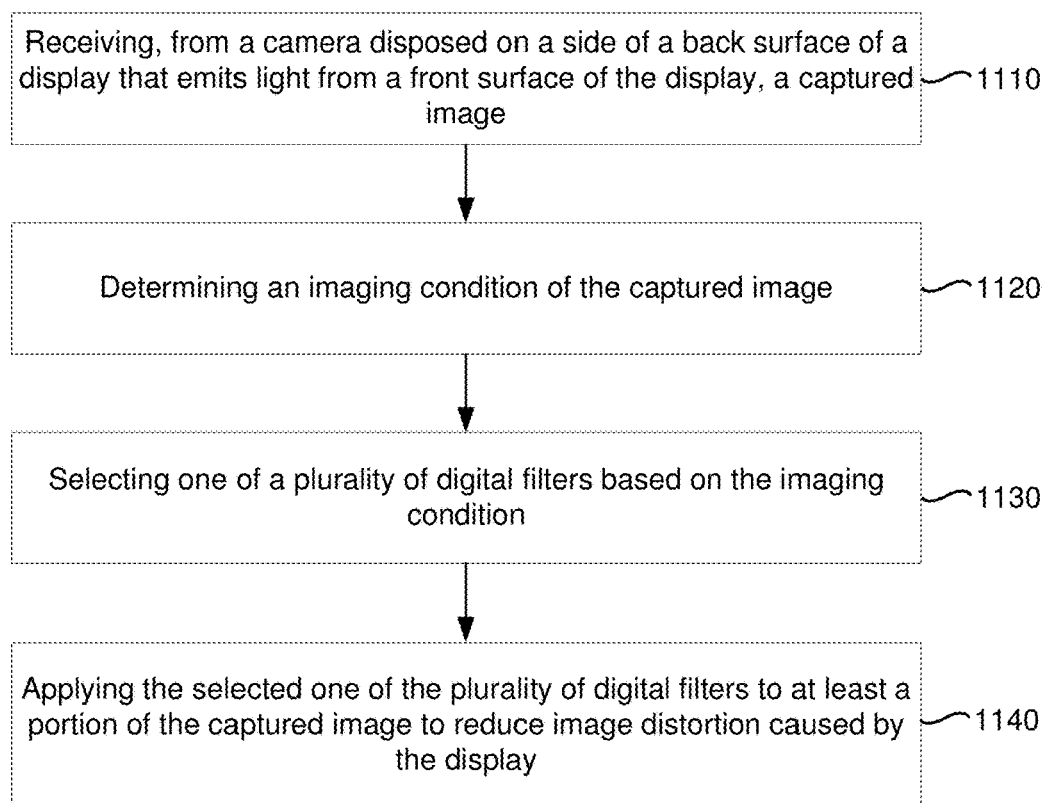
FIG. 11 is a flowchart representation of a method of restoring a captured image with a digital filter selected from a plurality of digital filters in accordance with some implementations.

FIG. 11 is a flowchart representation of a method 1100 of restoring a captured image with a digital filter selected from a plurality of digital filters in accordance with some implementations. In various implementations, the method 1100 is performed by a device with one or more processors, non-transitory memory, a display having a front side and a back side, the display including a plurality of pixel regions that emit light from the front side to display a displayed image and a plurality of apertures that transmit light from the front side to the back side, and a camera disposed on the back side of the display, the camera configured to capture a captured image (e.g., the electronic device 800 of FIG. 8).

In some implementations, the method 1100 is performed by processing logic, including hardware, firmware, software, or a combination thereof. In some implementations, the method 1100 is performed by a processor executing instructions (e.g., code) stored in a non-transitory computer-readable medium (e.g., a memory). Briefly, in some circumstances, the method 1100 includes receiving a captured image captured through a display and applying a digital filter (selected based on a determined imaging condition) to the captured image (or a portion thereof) to reduce image distortion caused by the display.

The method 1100 begins, at block 1110, with the device receiving, from a camera disposed on a side of a back surface of a display that emits light from a front surface of the display, a captured image. In various implementations, the device includes the camera (and, optionally, the display) and the device captures the captured image using the camera. In various implementations, the device receives the captured image from a camera separate from the device.

In some embodiments, the captured image is a RAW image in which each pixel value corresponds to the detected intensity of light by a respective sub-element associated with a color pane. In some embodiments, the captured image is an RGB image in which each pixel value includes a color triplet including three values corresponding to three color panes. In some embodiments, the captured image is an infrared image.

The method 1100 continues, at block 1120, with the device determining an imaging condition of the captured image. The method 1100 continues, at block 1130, with the device selecting one of a plurality of digital filters based on the imaging condition.

In various implementations, selecting one of the plurality of digital filters includes selecting one of a plurality of predetermined digital filters stored in a non-transitory memory (e.g., stored in the non-transitory memory before determining the imaging condition of the captured image (in block 1120)). For example, coefficients for the filters can be stored in the non-transitory memory before determining the imaging condition of the captured image (in block 1120). In various implementations, determining the imaging condition (in block 1120) is performed before the captured image is received (in block 1110). In various implementations, determining the imaging condition (in block 1120) is performed after the captured image is received (in block 1110). For example, in some embodiments, the imaging condition is determined based on the captured image.

In various implementations, selecting one of the plurality of digital filters (in block 1130) includes generating the digital filter. For example, in some embodiments, the method 1100 includes estimating a point spread function of the display and generating the first digital filter based on the point spread function and the imaging condition.

In some embodiments, determining the imaging condition (in block 1120) includes determining a noise level of the captured image. For example, in some embodiments, determining the imaging condition includes determining a signal-to-noise ratio of the captured image. In some embodiments, selecting one of the plurality of digital filters (in block 1130) includes selecting a first digital filter with a first inversion strength based on determining a first noise level and selecting a second digital filter with a second inversion strength greater than the first inversion strength based on determining a second noise level less than the first noise level.

In some embodiments, the device stores, before the imaging condition is determined (in block 1120), a plurality of predetermined digital filters corresponding to different noise level classes and the device selects the one of the plurality of digital filters by selecting one of the plurality of predetermined digital filters based on a noise level class corresponding to the determined noise level. In some embodiments, the device generates the digital filter based on the noise level and an estimated point spread function of the display.

In some embodiments, determining the imaging condition (in block 1120) includes determining a subject of the captured image. In various electronic devices, images may be captured in a portrait mode (in which the visual fidelity of the facial features of a person against a background are to be preserved at the expense of the visual fidelity of the background). In contrast, when not in portrait mode, such as when the user is imaging a landscape, the visual fidelity of the entire image is weighted equally. Accordingly, in various implementations, selecting one of the plurality of digital filters (in block 1130) includes selecting a first digital filter based on determining the subject of the captured image is a portrait and selecting a second digital filter, different than the first filter, based on determining the subject of the captured image is not a portrait.

In some embodiments, determining the imaging condition (in block 1120) includes determining a purpose of the captured image. For example, in some embodiments, an image may be saved for later viewing by a user, an image of a user may be subjected to a facial recognition algorithm, an image of a check may be transmitted to a banking institution to extract financial information, an image of a computer-readable code (e.g., a QR code or a credit card number) may be subjected to a computer decoding. Accordingly, in various implementations, selecting one of the plurality of digital filters (in block 1130) includes selecting a first digital filter based on determining the purpose of the captured image is facial recognition and selecting a second digital filter, different than the first filter, based on determining the purpose of the captured image is not facial recognition.

In some embodiments, determining the imaging condition (in block 1120) is based on at least one of an exposure time of the captured image, a light coherence of the captured image, or a camera identity of a plurality of cameras used to generate the captured image. For example, various electronic devices include a visible camera and an infrared camera. Accordingly, different digital filters are applied to images captured with the visible camera as compared to images captured with the infrared camera.

In some embodiments, determining the imaging condition (in block 1120) includes determining an illumination condition when the image was captured. Accordingly, in various implementations, selecting one of the plurality of digital filters (in block 1130) includes selecting a first digital filter based on determining the illumination condition is a near-infrared dot projection and selecting a second digital filter, different than the first filter, based on determining the illumination condition is a near-infrared flood illumination.

As noted above, in various implementations, the method 1100 is performed by the electronic device 800 of FIG. 8. Accordingly, in some embodiments, the electronic device 800 of FIG. 8 constitutes an apparatus comprising a display 810 having a front surface and a back surface, the display including a plurality of pixel regions that emit light from the front surface to display a displayed image and a plurality of apertures that transmit light from the front surface to the back surface. The apparatus comprises a camera 820 disposed on a side of the back surface of the display, the camera configured to capture a captured image. The apparatus comprises a processor 830 coupled to the display 810 and the camera 820, the processor 830 configured to receive the captured image, determine an imaging condition, select one of a plurality of digital filters based on the imaging condition, and apply the selected digital filter to the captured image to reduce the image distortion caused by the display.

As described above, in various implementations, one or more restoration filters are generated based on an estimated point spread function of a display and/or camera optics. As further described above, a restoration filter based on a point spread function undesirably amplifies noise at valleys in the frequency-domain. Accordingly, referring again to FIG. 8, in various implementations, the display 810 and/or optics 821 are designed or controlled to reduce valleys in the frequency-domain point spread function.

Figure 12:
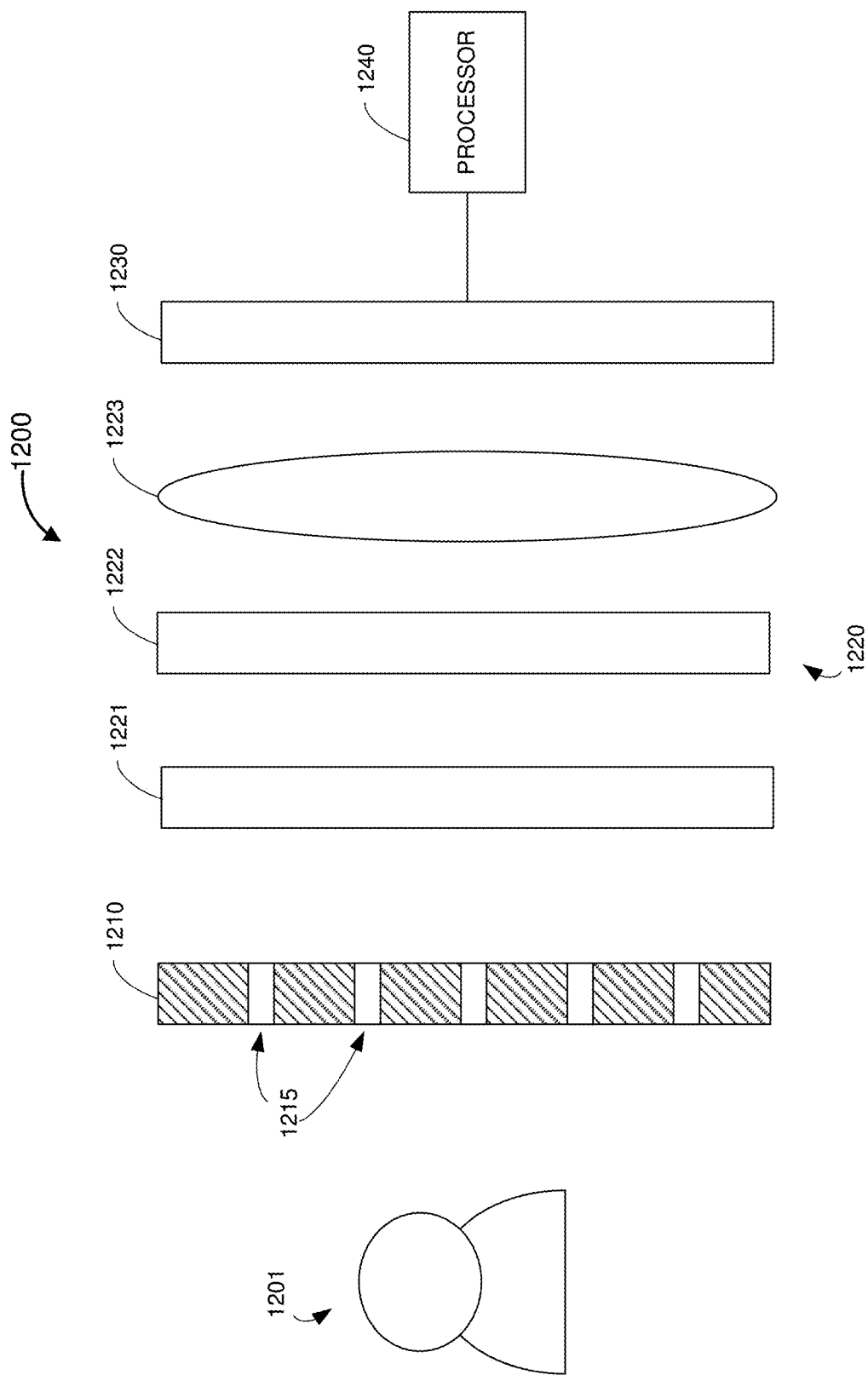
FIG. 12 illustrates a functional block diagram of a device including restoration optics configured to reduce image distortion caused by a display in accordance with some implementations.

FIG. 12 illustrates a functional block diagram of a device 1200 including restoration optics 1220 configured to reduce image distortion caused by a display 1210 in accordance with some implementations. The device 1200 includes a display 1210 having a front surface and a back surface, the display 1200 including a plurality of pixel regions that emit light from the front surface of the display to display a displayed image to a user 1201 and a plurality of apertures 1215 that transmit light from the front surface to the back surface (thereby introducing image distortion). In various implementations, the display 1210 corresponds to the display 810 of FIG. 8.

The device 1200 further includes a camera 1230 disposed on a side of the back surface of the display, the camera 1230 configured to capture a captured image. In various implementations, the camera 1230 corresponds to the sensor 822 of FIG. 8.

The device 1200 further includes restoration optics 1220 disposed between the display 1210 and the camera 1230, the restoration optics 1220 configured to reduce image distortion caused by the display 1210. In various implementations, the restoration optics 1220 correspond to the optics 821 of FIG. 8.

In various implementations, the restoration optics 1220 amplifies spatial frequencies corresponding to valleys in the frequency-domain point spread function of the display 1210. Accordingly, noise introduced by the camera 1230 is not amplified by the digital filter applied by the processor 1240. In various implementations, the restoration optics 1220 reduces spatial peaks in the spatial-domain point spread function of the display. Accordingly, saturation of the camera 1230 is avoided.

The device 1200 further includes a processor 1240 coupled to the display 1210 and the camera 1230 configured to further reduce image distortion caused by the display 1210. In various implementations, the processor 1240 corresponds to the processor 830 of FIG. 8.

Accordingly, the image distortion caused by the display 1210 is reduced both physically (e.g., by the restoration optics 1220) and digitally (e.g., by the processor 1240).

In various implementations, the restoration optics 1220 includes an optical filter 1221 (e.g., a phase-shift mask).

In various implementations, the restoration optics 1220 includes a bandpass filter 1222. For example, if the camera 1230 includes visible light sensor elements, the bandpass filter 1222 filters light to the visible wavelength range. As another example, if the camera 1230 includes infrared light sensor elements, the bandpass filter 1222 filters light to the infrared wavelength range. In various implementations, the bandpass filter 1222 includes a first portion that filters light to first wavelength range (e.g., visible light) corresponding to a first portion of the camera 1230 (or a first camera of a plurality of cameras) having sensor elements that detects the intensity of light in the first wavelength range and the bandpass filter 1222 includes a second portion that filters light to second wavelength range (e.g., infrared light) corresponding to a second portion of the camera 1230 (or a second camera of a plurality of cameras) having sensor elements that detects the intensity of light in the second wavelength range.

In various implementations, the restoration optics 1220 includes a lens 1223.

In various implementations, the processor 1240 controls the restoration optics 1220 (or one or more components thereof) to change the point spread function of the restoration optics 1220. In various implementations, the processor 1240 changes the point spread function based on an imaging condition as described above. For example, in various implementations, the lens 1223 includes a varifocal lens. As another example, in various implementations, the bandpass filter 1222 includes a tunable bandpass filter. As another example, in various implementations, the optical filter 1221 includes a variable phase-shift mask. For example, addressable portions of the optical filter 1221 are selectively made transparent or opaque by the processor 1240 to effect a change in the point spread function of the restoration optics 1220.

Although FIG. 12 illustrates example components of the restoration optics 1220, in various implementations, the restoration optics 1220 includes different and/or additional components. In various implementations, the restoration optics 1220 excludes the bandpass filter 1222 and/or the lens 1223, which are included in the camera 1230. Accordingly, in various implementations, the device 1200 includes restoration optics 1220 and the camera 1230 includes a lens separate from the restoration optics 1220. In various implementations, the device 1200 includes restoration optics 1220 and the camera 1230 includes a bandpass filter separate from the restoration optics 1220. In various implementations, the device 1200 includes restoration optics 1220 and the camera 1230 includes a lens and a bandpass filter separate from the restoration optics 1220.

FIG. 13 is a flowchart representation of a method 1300 of restoring a captured image with a digital filter based on a point spread function of restoration optics in accordance with some implementations. In various implementations, the method 1300 is performed by a device with one or more processors, non-transitory memory, a display having a front side and a back side, the display including a plurality of pixel regions that emit light from the front side to display a displayed image and a plurality of apertures that transmit light from the front side to the back side, and a camera disposed on the back side of the display, the camera configured to capture a captured image (e.g., the electronic device 800 of FIG. 8).

In some implementations, the method 1300 is performed by processing logic, including hardware, firmware, software, or a combination thereof. In some implementations, the method 1300 is performed by a processor executing instructions (e.g., code) stored in a non-transitory computer-readable medium (e.g., a memory). Briefly, in some circumstances, the method 1300 includes receiving a captured image captured through a display and restoration optics configured to reduce image distortion caused by the display and applying a digital filter to the captured image to further reduce image distortion caused by the display.

The method 1300 begins, at block 1310, with the device receiving, from a camera disposed on a side of a back surface of a display that emits light from a front surface of the display, a captured image. In various implementations, the device includes the camera (and, optionally, the display) and the device captures the captured image using the camera. In various implementations, the device receives the captured image from a camera separate from the device. The captured image corresponds to light that has passed through the display and restoration optics configured to reduce image distortion caused by the device.

In some embodiments, the captured image is a RAW image in which each pixel value corresponds to the detected intensity of light by a respective sub-element associated with a color pane. In some embodiments, the captured image is an RGB image in which each pixel value includes a color triplet including three values corresponding to three color panes. In some embodiments, the captured image is an infrared image.

In some embodiments, the restoration optics amplifies spatial frequencies corresponding to valleys in a point spread function of the display. In some embodiments, the restoration optics reduces spatial peaks in a point spread function of the display. In some embodiments, the restoration optics includes an optical filter. In some embodiments, the restoration optics includes a phase-shift mask. In some embodiments, the restoration optics includes at least one of a lens or a bandpass filter. In some embodiments, the camera includes a lens separate from the restoration optics. In some embodiments, the camera includes a bandpass filter separate from the restoration optics. In some embodiments, the camera includes a lens and a bandpass filter separate from the restoration optics.

The method 1300 continues, at block 1320, with the device applying a digital filter to at least a portion of the captured image to further reduce image distortion caused by the display. In various implementations, different digital filters are applied to different portions of the captured image (as described above with respect to FIG. 10). In various implementations, different digital filters are applied in response to determining different imaging conditions of the captured image (as describe above with respect to FIG. 11).

In some embodiments, applying the digital filter includes applying a digital filter based on a point spread function of the restoration optics. In particular, in some embodiments, applying the digital filter includes applying a digital filter based on a combined point spread function of the display and the restoration optics (e.g., a convolution of the spatial-domain point spread function of the display and the spatial-domain point spread function of the restoration optics or a multiplication of a frequency-domain point spread function of the display and a frequency-domain point spread function of the restoration optics). For example, in various implementations, the digital filter is a direct inverse filter of the combined point spread function of the display and the restoration optics. As another example, in various implementations, the digital filter is a Wiener filter of the combined point spread function of the display and the restoration optics.

In various implementations, the method 1300 further includes controlling the restoration optics to change a point spread function of the restoration optics. For example, in various implementations, controlling the restoration optics includes controlling the restoration optics based on an imaging condition of the captured image. In various implementations, the imaging condition is determined based on an ambient light sensor (ALS). In some embodiments, the device applies a first digital filter to a first image captured with the restoration optics controlled to have a first point spread function and applies a second digital filter, different than the first digital filter, to a second image captured with the restoration optics controlled to having a second point spread function, different than the first point spread function.

For example, in a low-light, low-SNR condition, the device controls the restoration optics to strongly reduce valleys in the frequency-domain point spread function of the display (e.g., amplifying spatial frequencies corresponding to valleys in the point spread function of the display, potentially disadvantageously reducing peaks or other parts of the frequency-domain point spread function and losing optical information captured by the camera). Further, the device applies a first digital filter to further reduce image distortion caused by the display. In a bright-light, high-SNR condition, the device controls the restoration optics to maximize the amount of optical information captured by the camera and applies a second digital filter, different than the first digital filter, to further reduce image distortion caused by the display.

As another example, in various implementations, in a low-light, low-SNR condition, the device controls the restoration optics to increase image brightness (e.g., to increase the amount of light passing through the restoration optics). Further, the device applies a first digital filter to reduce image distortion caused by the display. In a bright-light, high-SNR condition, the device controls the restoration optics to decrease image distortion (even at the expense of image brightness) and does not apply a second digital filter to further reduce image distortion caused by the display.

As noted above, in various implementations, the method 1300 is performed by the electronic device 800 of FIG. 8. Accordingly, the electronic device 800 of FIG. 8 constitutes an apparatus comprising a display 810 having a front surface and a back surface, the display 810 including a plurality of pixel regions that emit light from the front surface of the display 810 to display a displayed image and a plurality of apertures that transmit light from the front surface to the back surface. The apparatus comprises a camera (e.g., sensor 822) disposed on a side of the back surface of the display, the camera configured to capture a captured image. The apparatus comprises restoration optics (e.g., optics 821) disposed between the display and the camera, the restoration optics configured to reduce image distortion caused by the display. The apparatus comprises a processor coupled to the display 810 and the camera, the processor configured to apply a digital filter to the captured image to further reduce the image distortion caused by the display 810.

Although various implementations described above include applying one or more digital filters to the image to reduce image distortion caused by the display, in various implementations, other image restoration techniques to reduce image distortion are performed on at least a portion of the image.

For example, in various implementations, non-linear image restoration is performed on at least a portion of the image (e.g., regions that are saturated or include star-like reflections). For example, in various implementations, machine-learning restoration is performed on at least a portion of the image.

In various implementations, the camera 822 is a depth camera. Accordingly, in various implementations, the captured image is a matrix of pixel elements, each pixel element associated with a depth value. For example, in various implementations, the camera 822 is a time-of-flight camera. In various implementations, the time-of-flight camera is an indirect time-of-flight camera or a direct time-of-flight camera. In various implementations, the time-of-flight camera includes a pulse light source that emits a pulse of light a plurality of pixel elements. The time-of-flight camera determines, for each pixel element, a time between when the pulse of light is emitted and when a reflection is received by the pixel element. Using the speed of light, this time is converted into a depth value.

However, propagation of the pulse of light through the display 810 and propagation of the reflection through the display 810 diffracts the light, introducing distortion in the image. For example, a reflection that should be received at a first pixel location at a first time is diffracted and is, instead, received at a second pixel location at a second time.

In various implementations, the image is warped to compensate for the difference in pixel locations (e.g., that the reflection is received at a second pixel location instead of the correct first pixel location). In various implementations, the device performs a transformation on the image based on the properties of the display 810 to generate a transformed image with reduced image distortion.

In various implementations, the transformation is a forward mapping in which, for each pixel of the image at a pixel location in an untransformed space, a new pixel location is determined in a transformed space of the transformed image. Using the pixel locations in the transformed space and the pixel values of the pixels of the image, the device generates a transformed image using interpolation or other techniques.

In various implementations, the transformation is a backwards mapping in which, for each pixel of the transformed image at a pixel location in a transformed space, a source pixel location is determining in an untransformed space of the image. Using the source pixel locations in the untransformed space and the pixel values of the pixels of the image, the device generates a holed image using interpolation or other techniques.

In various implementations, the image is adjusted to compensate for the difference in pixel times (e.g., that the reflection is received at a second time instead of the correct first time). In various implementations, the pixel value of each pixel is adjusted by adding or subtracting a respective adjustment factor (which depends on the pixel location and the properties of the display).

In order to reduce image distortion, in various implementations, the apertures are designed to be resilient to diffraction effects. In general, the size, shape, and distribution of the apertures of the display 810 effect the point spread function. Because valleys in the frequency-domain undesirably result in amplified noise and peaks in the spatial domain undesirably result in saturation of the camera, the size, shape, and distribution of the apertures of the display can be designed to avoid these pitfalls.

Figures 14A, 14B, 14C, 14D, 14E:
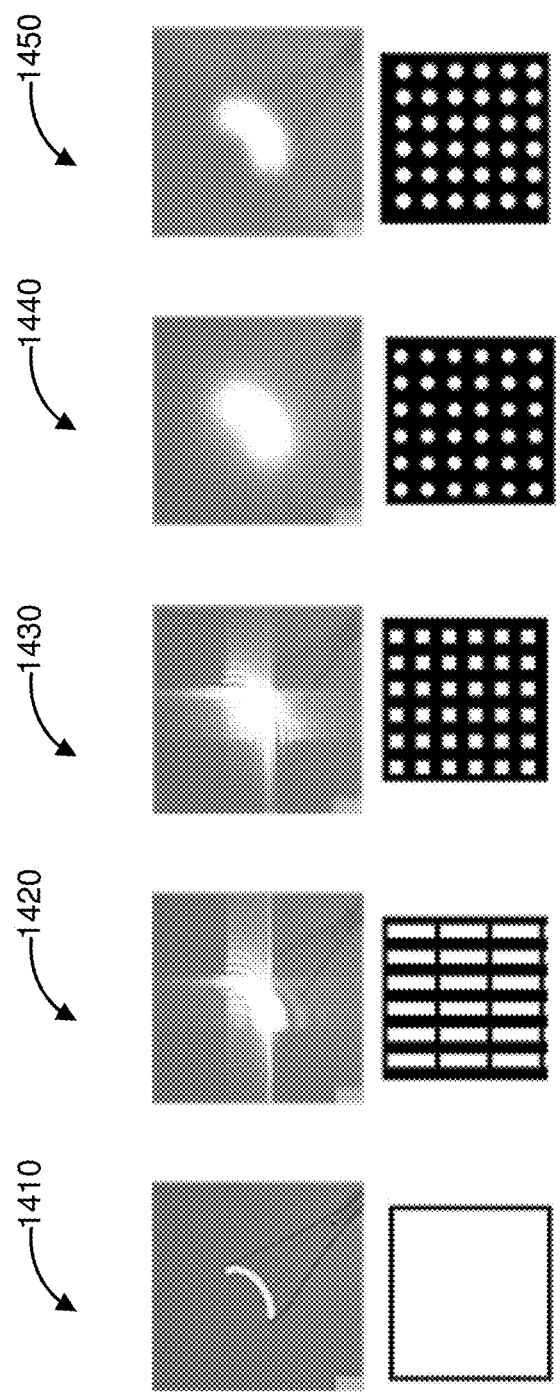
FIGS. 14A-14E illustrate example images through various aperture configurations in accordance with some implementations.

FIGS. 14A-14E illustrate example images through various aperture configurations in accordance with some implementations. FIG. 14A illustrates a first example image 1410 through a clear sheet (e.g., without apertures or pixel elements). FIG. 14B illustrates a second example image 1420 through a display with rectangular apertures at a resolution of 200×100 apertures per inch. FIG. 14C illustrates a third example image 1430 through a display with square apertures at a resolution of 200×200 apertures per inch. FIG. 14D illustrates a fourth example image 1440 through a display with circular apertures at a resolution of 200×200 apertures per inch. FIG. 14E illustrates a fifth example image 1450 through a display with apodized circular apertures at a resolution of 200×200 apertures per inch.

As illustrated in a comparison of FIG. 14C and FIG. 14D, circular apertures reduce long tail effects of the point spread function as compared to square apertures. As illustrated in a comparison of FIG. 14D and FIG. 14E, apodization reduces the diffusion introduced by the point spread function as compared to non-apodized apertures.

Figure 15B:
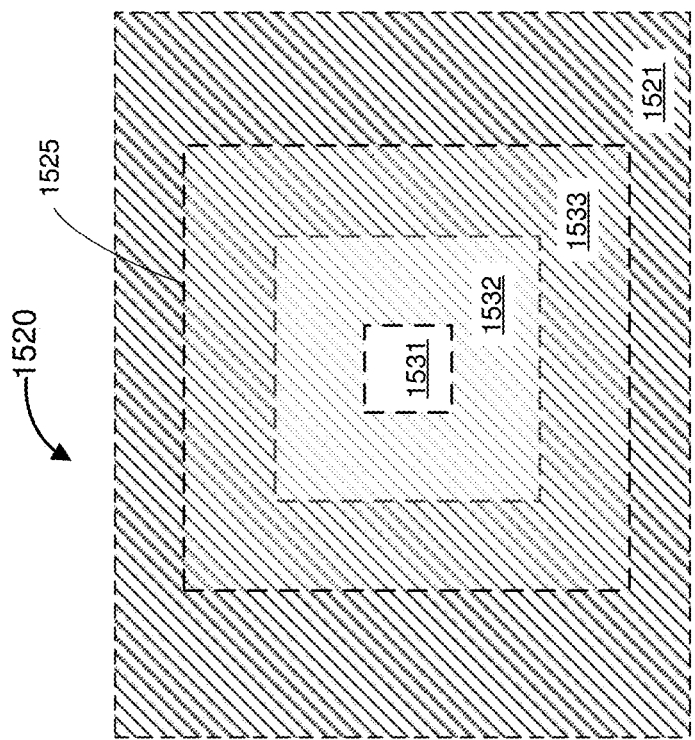
FIGS. 15A-15B illustrate example apertures in accordance with some implementations.
Figure 15A:
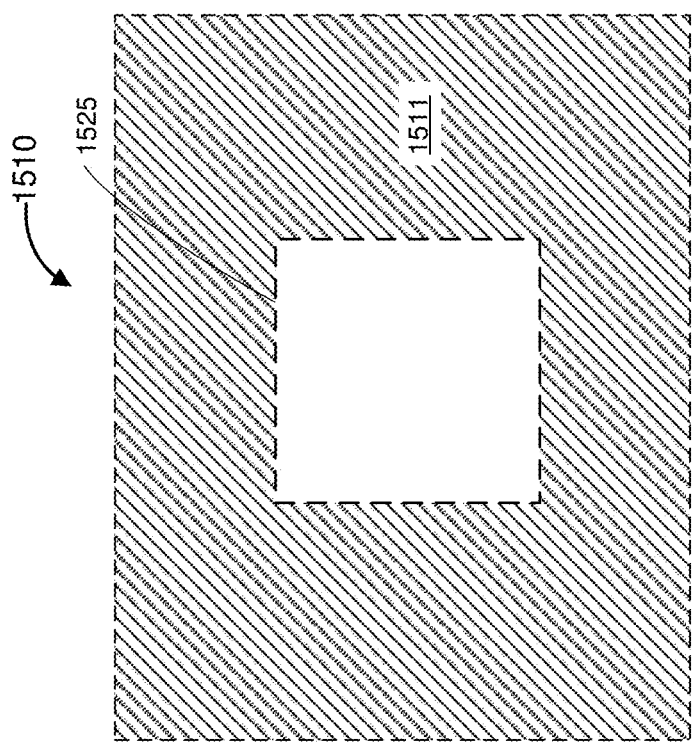

FIGS. 15A-15B illustrate example apertures in accordance with some implementations. FIG. 15A illustrates a portion of partially transparent display 1510 including an opaque substrate 1511 having a non-apodized aperture 1515 therein.

FIG. 15B illustrates a portion of a partially transparent display 1520 including an opaque substrate 1521 having an apodized aperture 1525 therein. The apodized aperture 1525 decreases in transparency from the center of the apodized aperture 1525. Accordingly, the apodized aperture 1525 includes a first portion 1531 in the center of the aperture having a first transparency (e.g., 100% transparent or 90% transparent). The apodized aperture 1525 includes a second portion 1532 surrounding the first portion 1531 and having a second transparency (e.g., 50% transparent) less than the first transparency. The apodized aperture 1525 includes a third portion 1533 surrounding the second portion 1532 and having a third transparency (e.g., 25% transparent) less than the second transparency.

In various implementations, the first portion 1531, second portion 1532, and third portion 1533 are constructed of different materials with different transparencies. In various implementations, the different materials are the same base material with different dopings to effect different transparencies. In various implementations, the first portion 1531, second portion 1532, and third portion 1533 are constructed of the same material with different sub-aperture patterns to effect different transparencies in the different portions.

Figure 16A:
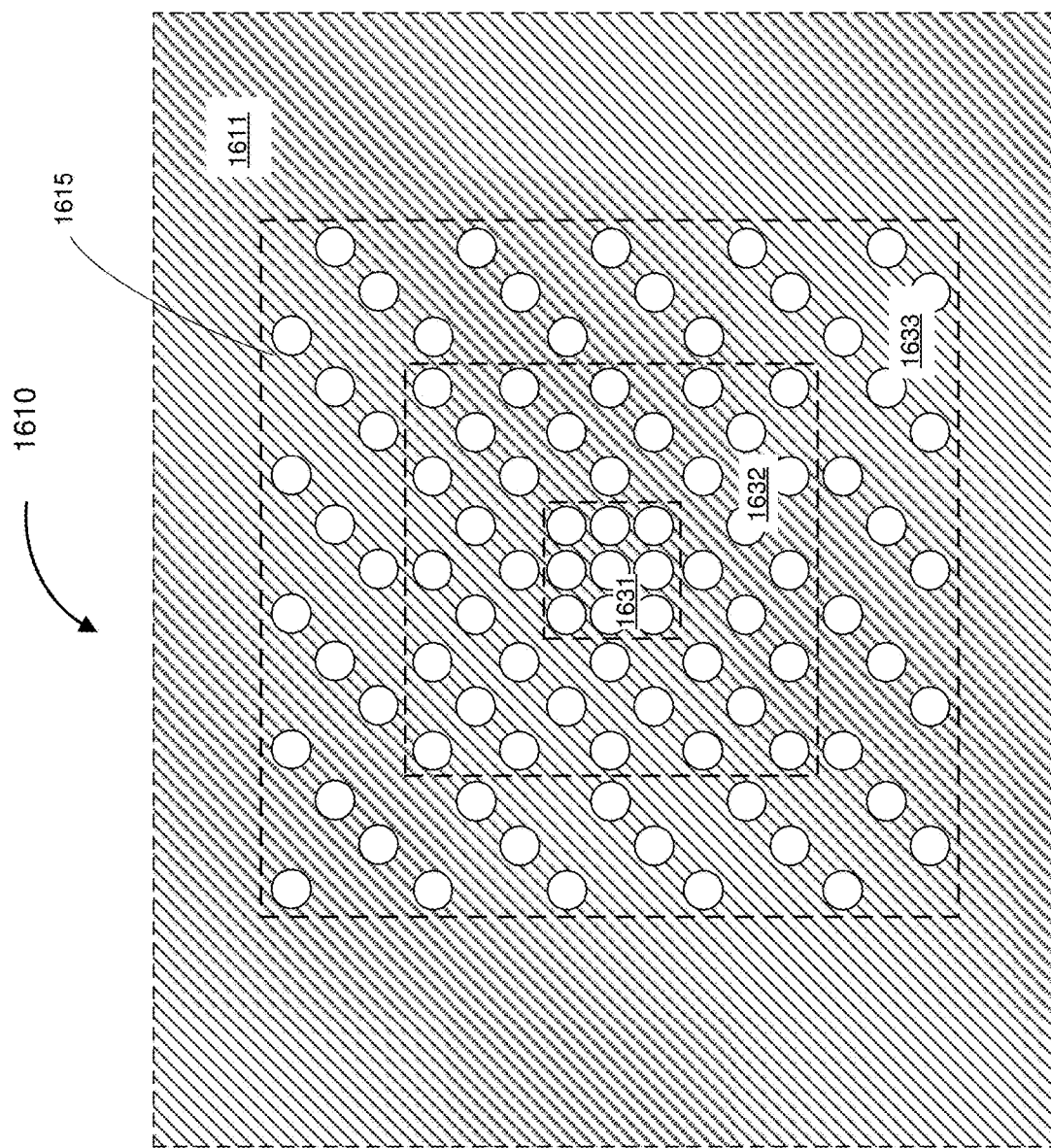
FIGS. 16A-16B illustrate apodized apertures in accordance with some implementations.
Figure 16B:
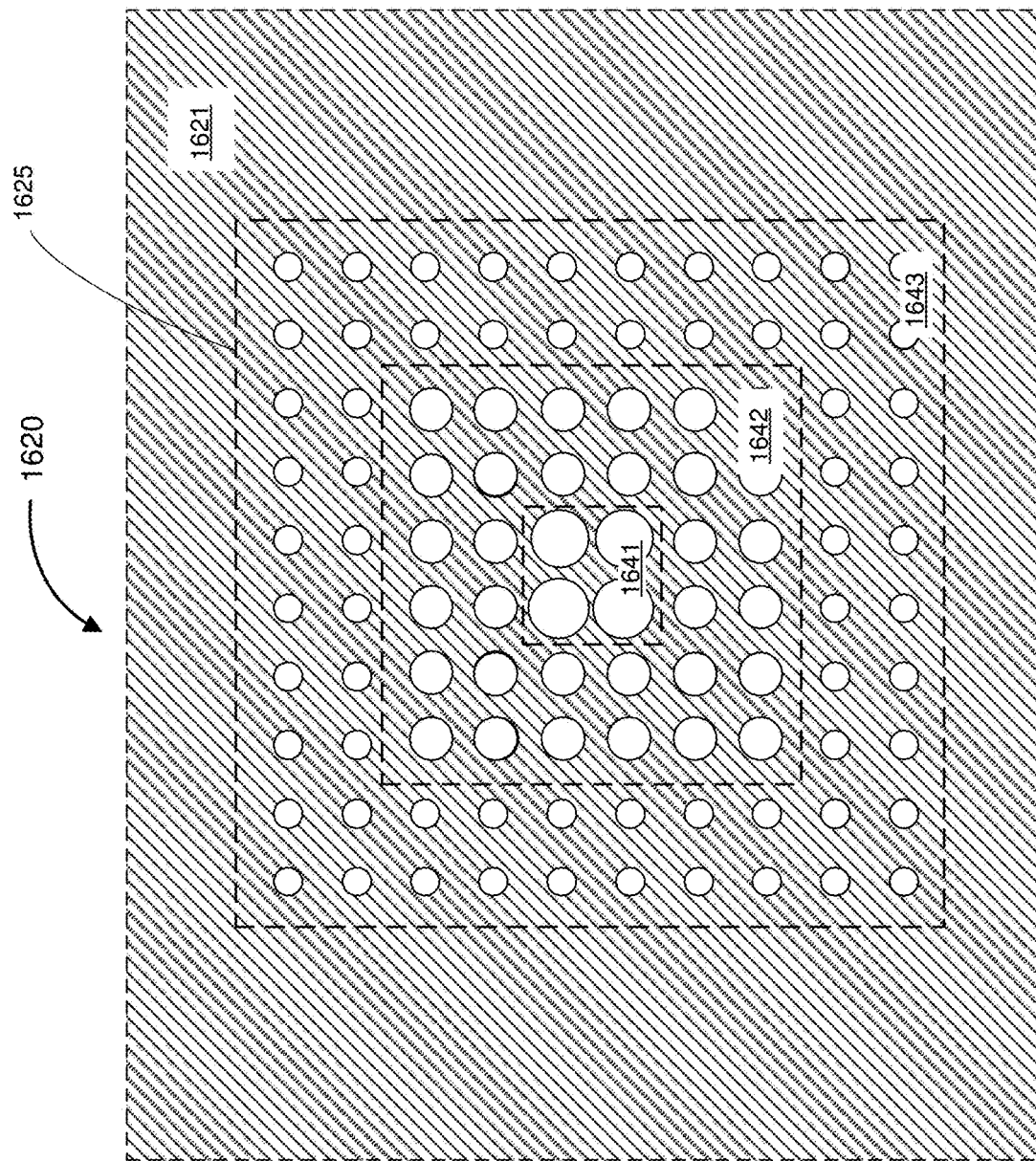

FIGS. 16A-16B illustrate apodized apertures in accordance with some implementations. FIG. 16A illustrates a portion of a partially transparent display 1610 including an opaque substrate 1611 having a dithered apodized aperture 1615 therein. The dithered apodized aperture 1615 decreases in transparency from the center of the dithered apodized aperture 1615. Accordingly, the dithered apodized aperture 1615 includes a first portion 1631 in the center of the aperture 1615 having a first transparency as a result of including first sub-apertures at a first resolution. The dithered apodized aperture 1615 includes a second portion 1632 surrounding the first portion 1631 and having a second transparency (e.g., 50% transparent) less than the first transparency as a result of including second sub-apertures (of the same size as the first sub-apertures) at a second resolution less than the first resolution. The dithered apodized aperture 1615 includes a third portion 1633 surrounding the second portion 1632 and having a third transparency (e.g., 33% transparent) less than the second transparency as a result of including third sub-apertures (of the same size as the first sub-apertures) at a third resolution less than the second resolution.

FIG. 16B illustrates a portion of a partially transparent display 1620 including an opaque substrate 1621 having a half-toned apodized aperture 1625 therein. The half-toned apodized aperture 1625 decreases in transparency from the center of the half-toned apodized aperture 1625. Accordingly, the half-toned apodized aperture 1625 includes a first portion 1641 in the center of the half-toned apodized aperture 1625 having a first transparency as a result of including first sub-apertures of a first size at a resolution. The half-toned apodized aperture 1625 includes a second portion 1642 surrounding the first portion 1641 and having a second transparency (e.g., 50% transparent) less than the first transparency as a result of including second sub-apertures of a smaller size than the first sub-apertures at the same resolution as the first sub-apertures. The half-toned apodized aperture 1625 includes a third portion 1643 surrounding the second portion 1642 and having a third transparency (e.g., 25% transparent) less than the second transparency as a result of including third sub-apertures of a smaller size than the second sub-apertures at the same resolution as the first sub-apertures and the second sub-apertures.

Although FIG. 15B and FIGS. 16A-16B illustrate square apertures, it is to be appreciated that the apodized apertures 1525, 1615, and 1625 can be any shape (e.g., circular, square, or elliptical). Similarly, although the sub-apertures of FIGS. 16A-16B are illustrated as circular, the sub-apertures can be any shape (e.g., circular, square, or elliptical).

Further, it is to be appreciated that FIG. 15B and FIGS. 16A-16B are not to scale and, in various implementations, the first portion having peak transparency may constitute approximately 90% or 95% of the aperture whereas the second portion, third portion, and other portions decreasing in transparency may constitute approximately 10% or 5% of the aperture.

FIG. 17 is a flowchart representation of a method 1700 of restoring a captured image with a digital filter based on a point spread function of a display having apodized apertures in accordance with some implementations. In various implementations, the method 1700 is performed by a device with one or more processors, non-transitory memory, a display having a front side and a back side, the display including a plurality of pixel regions that emit light from the front side to display a displayed image and a plurality of apodized apertures that transmit light from the front side to the back side, and a camera disposed on the back side of the display, the camera configured to capture a captured image (e.g., the electronic device 800 of FIG. 8).

In some implementations, the method 1700 is performed by processing logic, including hardware, firmware, software, or a combination thereof. In some implementations, the method 1700 is performed by a processor executing instructions (e.g., code) stored in a non-transitory computer-readable medium (e.g., a memory). Briefly, in some circumstances, the method 1700 includes receiving a captured image captured through a display having apodized apertures and applying a digital filter to the captured image to reduce image distortion caused by the display.

The method 1700 begins, at block 1710, with the device receiving, from a camera disposed on a side of a back surface of a display that emits light from a front surface of the display, a captured image. In various implementations, the device includes the camera (and, optionally, the display) and the device captures the captured image using the camera. In various implementations, the device receives the captured image from a camera separate from the device. The captured image corresponds to light that has passed through a plurality of apodized apertures of display.

In some embodiments, the captured image is a RAW image in which each pixel value corresponds to the detected intensity of light by a respective sub-element associated with a color pane. In some embodiments, the captured image is an RGB image in which each pixel value includes a color triplet including three values corresponding to three color panes. In some embodiments, the captured image is an infrared image.

In various implementations, a particular one of the plurality of apertures includes a first region having a first transparency and a second region surrounding the first region and having a second transparency less than the first transparency. In various implementations, the first region comprises a first material having the first transparency and second region comprises a second material, different than the first material, having the second transparency. In various implementations, the first region includes a plurality of first sub-apertures of a first size at a first resolution and the second region includes a plurality of second sub-apertures of the first size at a second resolution less than the first resolution. In various implementations, the first region includes a plurality of first sub-apertures of a first size at a first resolution and the second region includes a plurality of second sub-apertures of a second size less than the first size at the first resolution.

The method 1700 continues, at block 1720, with the device applying a digital filter to at least a portion of the captured image to reduce image distortion caused by the display. In various implementations, different digital filters are applied to different portions of the captured image (as described above with respect to FIG. 10). In various implementations, different digital filters are applied in response to determining different imaging conditions of the captured image (as describe above with respect to FIG. 11).

In some embodiments, applying the digital filter includes applying a digital filter based on a point spread function of the display.

As noted above, in various implementations, the method 1700 is performed by the electronic device 800 of FIG. 8. Accordingly, in some embodiments, the electronic device 800 of FIG. 8 constitutes an apparatus comprising a display 810 having a front surface and a back surface, the display 810 including a plurality of pixel regions that emit light from the front surface of the display 810 to display a displayed image and a plurality of apertures that transmit light from the front surface to the back surface, wherein the plurality of apertures are apodized. The apparatus comprises a camera 820 disposed on a side of the back surface of the display, the camera configured to capture a captured image. The apparatus comprises a processor coupled to the display 810 and the camera 820, the processor configured to apply a digital filter to the captured image to reduce the image distortion caused by the display 810.

Figure 18B:
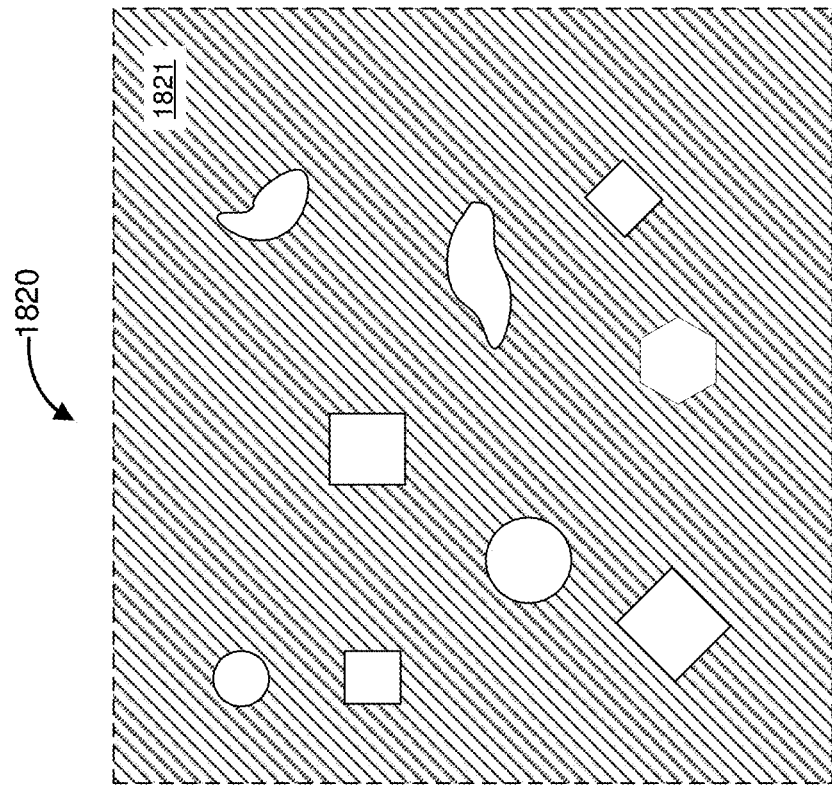
FIGS. 18A-18B illustrate apertures in a non-grid arrangement in accordance with some implementations.
Figure 18A:
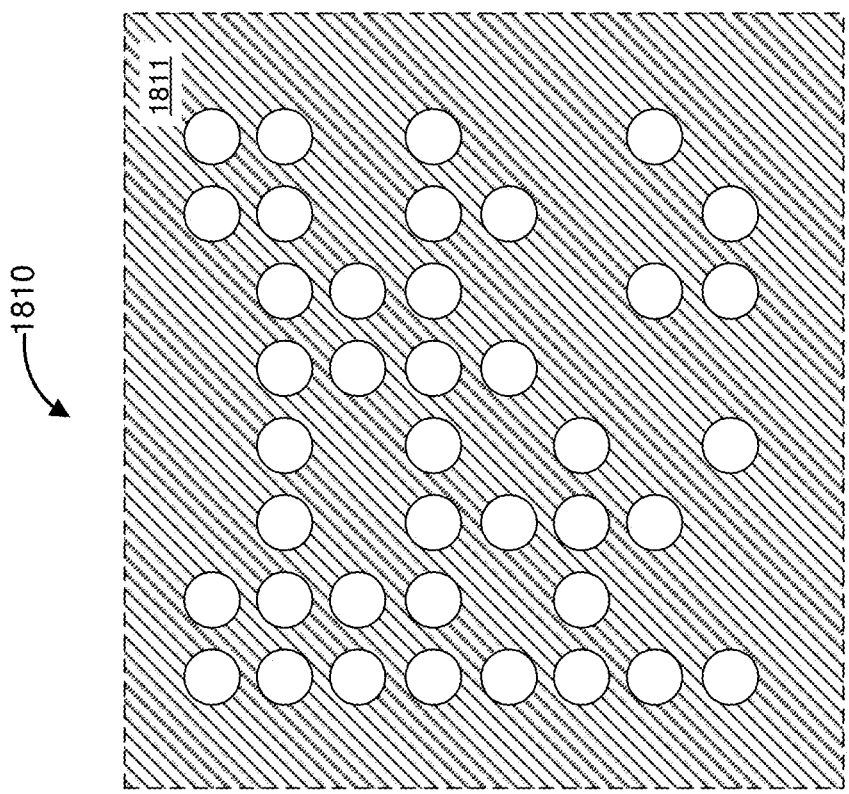

FIGS. 18A-18B illustrate apertures in a non-grid arrangement in accordance with some implementations. Disposing the apertures in a non-grid arrangement reduces long-tail effects, valleys in the frequency-domain point spread function, and peaks in the spatial-domain point spread function.

FIG. 18A illustrates a portion of a partially transparent display 1810 including an opaque substrate 1811 having a plurality of apertures therein. Whereas the location of each of the apertures lies on a grid, not each location of the grid includes an aperture resulting in a non-grid arrangement of the plurality of apertures. In various implementations, whether the grid location includes an aperture or is opaque is determined randomly (or, as incorporated into the definition of "randomly," pseudo-randomly). In various implementations (and as illustrated in FIG. 18A), whether the grid location includes an aperture is determined according to a Hadamard matrix. Although FIG. 18A illustrates a square grid, various implementations implement a hexagonal grid or offset grid.

FIG. 18B illustrates a portion of a partially transparent display 1820 including an opaque substrate 1821 having a plurality of apertures therein. At least some of the locations of the apertures do not lie on a grid, resulting in a non-grid arrangement of the plurality of apertures. In various implementations, the locations of the apertures are determined randomly. Further, the sizes and shapes of the plurality of apertures differ from one another and include irregular shapes. In various implementations, the sizes and/or shapes of the apertures are determined randomly. For example, in FIG. 18B, the plurality of apertures includes a first circular aperture of a first size, a second circular aperture of second size (different than the first size), a first square aperture of a first size, a second square aperture of a second size (different than the first size), a first diamond aperture of a first size, a second diamond aperture of a second size (different than the first size), a hexagonal aperture, a first irregular aperture of a first irregular shape, and a second irregular aperture of a second irregular shape (different than the first irregular shape).

FIG. 19 is a flowchart representation of a method 1900 of restoring a captured image with a digital filter based on a point spread function of a display having a plurality of apertures disposed in a non-grid arrangement in accordance with some implementations. In various implementations, the method 1900 is performed by a device with one or more processors, non-transitory memory, a display having a front side and a back side, the display including a plurality of pixel regions that emit light from the front side to display a displayed image and a plurality of apertures (disposed in a non-grid arrangement) that transmit light from the front side to the back side, and a camera disposed on the back side of the display, the camera configured to capture a captured image (e.g., the electronic device 800 of FIG. 8).

In some implementations, the method 1900 is performed by processing logic, including hardware, firmware, software, or a combination thereof. In some implementations, the method 1900 is performed by a processor executing instructions (e.g., code) stored in a non-transitory computer-readable medium (e.g., a memory). Briefly, in some circumstances, the method 1900 includes receiving a captured image captured through a display having a plurality of apertures disposed in a non-grid arrangement and applying a digital filter to the captured image to reduce image distortion caused by the display.

The method 1900 begins, at block 1910, with the device receiving, from a camera disposed on a side of a back surface of a display that emits light from a front surface of the display, a captured image. In various implementations, the device includes the camera (and, optionally, the display) and the device captures the captured image using the camera. In various implementations, the device receives the captured image from a camera separate from the device. The captured image corresponds to light that has passed through a plurality of apertures of display disposed in a non-grid arrangement.

In some embodiments, the captured image is a RAW image in which each pixel value corresponds to the detected intensity of light by a respective sub-element associated with a color pane. In some embodiments, the captured image is an RGB image in which each pixel value includes a color triplet including three values corresponding to three color panes. In some embodiments, the captured image is an infrared image.

In various implementations, a location of each of the plurality of apertures lies on a grid, but not each location of the grid includes an aperture. In some embodiments, whether a location of the grid includes an aperture is determined randomly. In some embodiments, whether a location of the grid includes an aperture is determined accordingly to a Hadamard matrix.

In various implementations, locations of at least some of the plurality of apertures do not lie on a grid. In some embodiments, the locations of at least some of the plurality of apertures are determined randomly.

In various implementations, a first aperture of the plurality of apertures is of a different size than a second aperture of the plurality of apertures. In various implementations, a first aperture of the plurality of apertures is of a different shape than a second aperture of the plurality of apertures. In some embodiments, the sizes and/or shapes of at least some of the plurality of apertures are determined randomly.

The method 1900 continues, at block 1920, with the device applying a digital filter to at least a portion of the captured image to reduce image distortion caused by the display. In various implementations, different digital filters are applied to different portions of the captured image (as described above with respect to FIG. 10). In various implementations, different digital filters are applied in response to determining different imaging conditions of the captured image (as describe above with respect to FIG. 11).

In some embodiments, applying the digital filter includes applying a digital filter based on a point spread function of the display.

In various implementations, the device controls the transparency (or opacity) of the display (or, more particularly, apertures thereof). For example, addressable portions of the display are selectively made transparent or opaque by the device to effect a change in the point spread function of the display. In various implementations, the device turns "on" or "off" particular ones of a plurality of apertures with locations on a grid. In various implementations, the device controls the size, shape, and/or location of apertures of the display.

Thus, in various implementations, the device controls the display to change a point spread function of the display. For example, in various implementations, controlling the display includes controlling the display based on an imaging condition of the captured image. In some embodiments, the device applies a first digital filter to a first image captured with the display controlled to have a first point spread function and applies a second digital filter, different than the first digital filter, to a second image captured with the display controlled to having a second point spread function, different than the first point spread function.

For example, in a low-light, low-SNR condition, the device controls the display to include more and/or larger apertures to increase the SNR of the captured image. Further, the device applies a first digital filter to further reduce image distortion caused by the display. In a bright-light, high-SNR condition, the device controls the restoration optics to minimize peaks in the spatial-domain point spread function to avoid saturation and applies a second digital filter, different than the first digital filter, to reduce image distortion caused by the display.

As noted above, in various implementations, the method 1900 is performed by the electronic device 800 of FIG. 8. Accordingly, the electronic device 800 of FIG. 8 constitutes an apparatus comprising a display 810 having a front surface and a back surface, the display 810 including a plurality of pixel regions that emit light from the front surface of the display 810 to display a displayed image and a plurality of apertures that transmit light from the front surface to the back surface, wherein the plurality of apertures are arranged in a non-grid arrangement. The apparatus comprises a camera 820 disposed on a side of the back surface of the display, the camera configured to capture a captured image. The apparatus comprises a processor coupled to the display 810 and the camera 820, the processor configured to apply a digital filter to the captured image to reduce the image distortion caused by the display 810.

In various implementations, the processor 830 controls (e.g., using the GPU 832) the display 810 to display an image. In various implementations, the processor 832 controls the display to change the displayed image while a captured image is captured by the camera 820.

Figure 20:
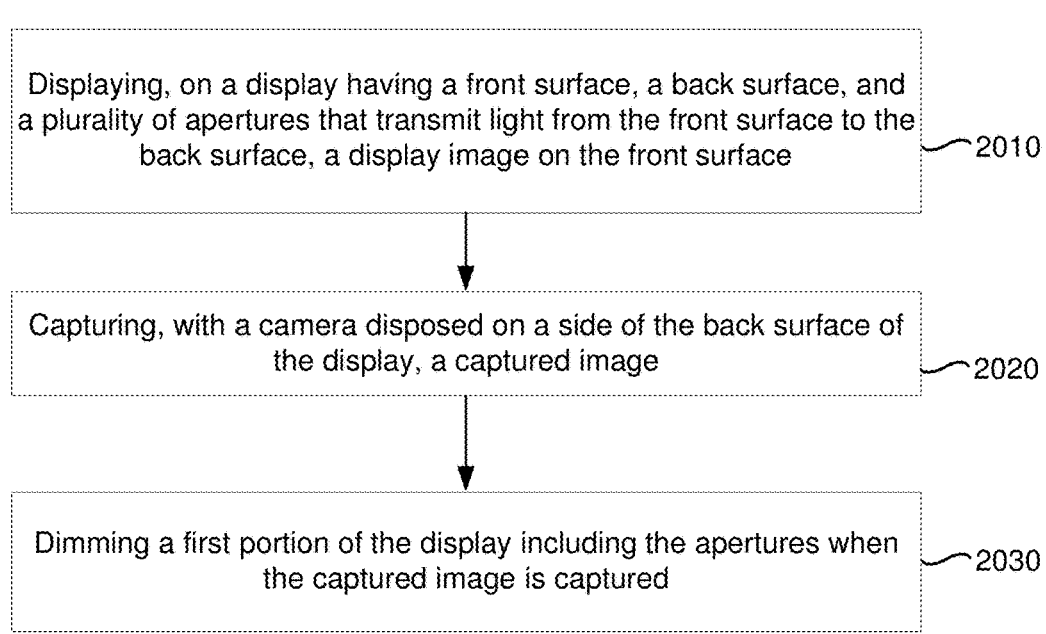
FIG. 20 is a flowchart representation of a method of capturing a captured image in accordance with some implementations.

FIG. 20 is a flowchart representation of a method 2000 of capturing a captured image in accordance with some implementations. In various implementations, the method 2000 is performed by a device with one or more processors, non-transitory memory, a display having a front side and a back side, the display including a plurality of pixel regions that emit light from the front side to display a displayed image and a plurality of apertures that transmit light from the front side to the back side, and a camera disposed on the back side of the display, the camera configured to capture a captured image (e.g., the electronic device 800 of FIG. 8).

In some implementations, the method 2000 is performed by processing logic, including hardware, firmware, software, or a combination thereof. In some implementations, the method 2000 is performed by a processor executing instructions (e.g., code) stored in a non-transitory computer-readable medium (e.g., a memory). Briefly, in some circumstances, the method 2000 includes displaying a displayed image on a display, capturing a captured image with a camera, and dimming at least a portion of the display in front of the camera when the captured image is captured.

The method 2000 begins, at block 2010, with the device displaying, on a display having a front surface, a back surface, and a plurality of apertures that transmit light from the front surface to the back surface, a displayed image on the front surface.

The method 2000 continues, at block 2020, with the device capturing, with a camera disposed on a side of the back surface of the display, a captured image.

The method 2000 continues, at block 2030, with the device dimming at least a first portion of the display including the apertures when the captured image is captured (in block 2020). In some embodiments, the first portion of the display is dimmed to 50% of its light intensity when displaying the displayed image. In some embodiments, the first portion of the display is dimmed to 25% of its light intensity. In some embodiments, the first portion of the display is blacked out (e.g., 0% of its light intensity). In some embodiments, an amount at least the first portion of the display is dimmed is based on an imaging condition of the captured image. Thus, at least a first portion of the display is dynamically dimmed by time multiplexing display on the first portion of the display and image capture with the camera.

In various implementations, the display includes a partially transmissive portion (e.g., a first portion including the plurality of apertures) and an opaque portion (e.g., a second portion not including the plurality of apertures). For example, in FIG. 3, the display 310 includes the partially transmissive region 311 (e.g., a first portion) and the remainder of the display 310 (e.g., a second portion).

In various implementations, the second portion is dimmed along with the first portion. Thus, in various implementations, the method 2000 includes dimming a second portion of the display not including the apertures when the captured image is captured. In some embodiments, the second portion is dimmed the same amount (e.g., 50%, 25%, or 0% of its light intensity) as the first portion. In some embodiments, the second portion is dimmed a different amount than the first portion. For example, in some embodiments, the first portion is blacked out and the second portion is dimmed 50%.

In various implementations, the second portion is not dimmed along with the first portion. Thus, in various implementations, the method 2000 includes displaying, without dimming, the displayed image on a second portion of the display not including the apertures when the captured image is captured.

In various implementations, the second portion displays a flash or other illumination (e.g., displays an all-white image) while capturing the captured image. Thus, in various implementations, the method 2000 includes displaying a flash on a second portion of the display not including the apertures when the captured image is captured.

In various implementations, the method 2000 includes applying a digital filter to the captured image to reduce image distortion caused by the display. In some embodiments, the digital filter is based on the displayed image (e.g., its brightness, its color, its contrast, or its content). In various implementations, different digital filters are applied to different portions of the captured image (as described above with respect to FIG. 10). In various implementations, different digital filters are applied in response to determining different imaging conditions of the captured image (as describe above with respect to FIG. 11). Thus, in various implementations, different digital filters are applied to different color channels of the captured image based on the content of the displayed image (e.g., its color).

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. An apparatus comprising: a display having a front surface and a back surface, the display including a plurality of pixel regions that emit light from the front surface to display a displayed image and a plurality of apertures that transmit light from the front surface to the back surface; a camera disposed on a side of the back surface of the display, the camera configured to capture a captured image; and a processor coupled to the display and the camera, the processor configured to: receive the captured it determine an imaging condition of the captured image; select one of a plurality of digital filters based on the imaging condition; and apply the selected digital filter to the captured image to reduce image distortion caused by the display.

2. The apparatus of claim 1, wherein the processor is configured to determine the imaging condition by determining a noise level of captured image.

3. The apparatus of claim 2, wherein the processor is configured to select the one of the plurality of digital filters by:
selecting a first digital filter with a first inversion strength based on determining a first noise level; and
selecting a second digital filter with a second inversion strength greater than the first inversion strength based on determining a second noise level less than the first noise level.

4. The apparatus of claim 1, wherein the processor is configured to determine the imaging condition by determining a subject of the captured image.

5. The apparatus of claim 4, wherein the processor is configured to select the one of the plurality of digital filters by:
selecting a first digital filter based on determining the subject of the captured image is a portrait; and
selecting a second digital filter, different than the first filter, based on determining the subject of the captured image is not a portrait.

6. The apparatus of claim 1, wherein the processor is configured to determine the imaging condition by determining a purpose of the captured image.

7. The apparatus of claim 6, wherein the processor is configured to select the one of the plurality of digital filters by:
selecting a first digital filter based on determining the purpose of the captured image is facial recognition; and
selecting a second digital filter, different than the first filter, based on determining the purpose of the captured image is not facial recognition.

8. The apparatus of claim 1, wherein the processor is configured to determine the imaging condition based on at least one of an exposure time of the captured image, a light coherence of the captured image, or a camera identity of a camera of a plurality of cameras used to generate the captured image.

9. The apparatus of claim 1, wherein the processor is configured to select the one of the plurality of digital filters by selecting one of a plurality of digital filters stored in a non-transitory memory before determining the imaging condition.

10. The apparatus of claim 1, wherein the processor is configured to select the one of the plurality of digital filters by generating the digital filter based on a point spread function of the display and the imaging condition.

11. The apparatus of claim 1, wherein the processor is configured to determine the imaging condition by determining an illumination condition when the image was captured.

12. The apparatus of claim 11, wherein the processor is configured to select the one of the plurality of digital filters by:
selecting a first digital filter based on determining the illumination condition is a near-infrared dot projection; and
selecting a second digital filter, different than the first filter, based on determining the illumination condition is a near-infrared flood illumination.

13. A method comprising:
receiving, from a camera disposed on a side of a back surface of a display that emits light from a front surface of the display, a captured image;
determining an imaging condition of the captured image;
selecting one of a plurality of digital filters based on the imaging condition; and
applying the selected one of the plurality of digital filters to at least a portion of the captured image to reduce image distortion caused by the display.

14. The method of claim 12, wherein determining the imaging condition includes determining a noise level of captured image.

15. The method of claim 12, wherein determining the imaging condition includes determining a subject of the captured image.

16. The method of claim 12, wherein determining the imaging condition includes determining a purpose of the captured image.

17. The method of claim 12, wherein determining the imaging condition is based on at least one of an exposure time of the captured image, a light coherence of the captured image, or a camera identity of a camera of a plurality of cameras used to generate the captured image.

18. The method of claim 12, wherein selecting the one of the plurality of digital filters includes generating the digital filter based on a point spread function of the display and the imaging condition.

19. The method of claim 12, wherein determining the imaging condition includes determining an illumination condition when the image was captured.

20. A non-transitory computer-readable medium having instructions encoded thereof which, when executed by a processor of a device, causes the device to:
- receive, from a camera disposed on a side of a back surface of a display that emits light from a front surface of the display, a captured image;
- determine an imaging condition of the captured image;
- select one of a plurality of digital filters based on the imaging condition; and
- apply the selected one of the plurality of digital filters to at least a portion of the captured image to reduce image distortion caused by the display.

\* \* \* \* \*